(12) United States Patent
Dickinson et al.

(10) Patent No.: US 9,990,089 B2
(45) Date of Patent: Jun. 5, 2018

(54) SENSOR ARRAY WITH RECEIVER BIAS ELECTRODE

(71) Applicant: QUALCOMM Incorporated, San Diego, CA (US)

(72) Inventors: Timothy Dickinson, Carlsbad, CA (US); Lennart Karl-Axel Mathe, San Diego, CA (US); Scott McCarthy, San Diego, CA (US); Kostadin Dimitrov Djordjev, San Jose, CA (US); Louis Dominic Oliveira, San Diego, CA (US); Qubo Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 953 days.

(21) Appl. No.: 14/332,242

(22) Filed: Jul. 15, 2014

(65) Prior Publication Data

US 2015/0016223 A1      Jan. 15, 2015

Related U.S. Application Data

(60) Provisional application No. 61/846,585, filed on Jul. 15, 2013, provisional application No. 61/846,592, (Continued)

(51) Int. Cl.
*G01S 15/00* (2006.01)
*G06F 3/043* (2006.01)
(Continued)

(52) U.S. Cl.
CPC .............. *G06F 3/043* (2013.01); *G01H 1/04* (2013.01); *G01S 15/02* (2013.01); *G06F 3/0416* (2013.01); *G06F 3/0436* (2013.01)

(58) Field of Classification Search
USPC .......................................... 367/87
See application file for complete search history.

(56) References Cited

U.S. PATENT DOCUMENTS

| | | | | |
|---|---|---|---|---|
| 2,994,060 | A | * | 7/1961 | Ross ...................... G01S 1/02 342/201 |
| 5,610,629 | A | | 3/1997 | Baur |

(Continued)

FOREIGN PATENT DOCUMENTS

| | | |
|---|---|---|
| CN | 101512467 A | 8/2009 |
| JP | 2011234073 A | 11/2011 |

OTHER PUBLICATIONS

International Search Report and Written Opinion for International Application No. PCT/US2014/046761, ISA/EPO, dated Nov. 24, 2014, 10 pages.

(Continued)

*Primary Examiner* — James R Hulka
(74) *Attorney, Agent, or Firm* — Qualcomm Incorporated-Toler

(57) ABSTRACT

A method of operation of an ultrasonic sensor array includes receiving a receiver bias voltage at a receiver bias electrode of the ultrasonic sensor array to bias piezoelectric sensor elements of the ultrasonic sensor array. The method further includes receiving a transmitter control signal at the ultrasonic sensor array to cause an ultrasonic transmitter of the ultrasonic sensor array to generate an ultrasonic wave. The method further includes generating data samples based on a reflection of the ultrasonic wave. The receiver bias voltage and the transmitter control signal are received from an integrated circuit that is coupled to the ultrasonic sensor array.

28 Claims, 17 Drawing Sheets

Related U.S. Application Data filed on Jul. 15, 2013, provisional application No. 61/846,604, filed on Jul. 15, 2013.

(51) Int. Cl.
*G01H 1/04* (2006.01)
*G01S 15/02* (2006.01)
*G06F 3/041* (2006.01)

(56) References Cited

U.S. PATENT DOCUMENTS

| | | | |
|---|---|---|---|
| 8,076,821 B2* | 12/2011 | Degertekin | B06B 1/0292 |
| | | | 310/309 |
| 8,269,752 B2 | 9/2012 | Takahashi et al. | |
| 8,599,175 B2 | 12/2013 | Iwata et al. | |
| 8,605,042 B2 | 12/2013 | Jang et al. | |
| 8,847,901 B2* | 9/2014 | Oh | G06F 3/0416 |
| | | | 178/18.01 |
| 8,959,003 B2* | 2/2015 | Brugler | G06F 11/3082 |
| | | | 345/440 |
| 9,063,619 B2* | 6/2015 | Yang | G06F 3/0416 |
| 2005/0215909 A1 | 9/2005 | Barnes | B06B 1/0292 |
| | | | 600/459 |
| 2005/0253858 A1 | 11/2005 | Ohkami et al. | |
| 2006/0181524 A1 | 8/2006 | Nakazawa et al. | |
| 2009/0143106 A1 | 6/2009 | Meitzler et al. | |
| 2009/0267928 A1 | 10/2009 | Fryer et al. | |
| 2010/0006348 A1* | 1/2010 | Iwata | G06F 3/045 |
| | | | 178/18.01 |
| 2010/0085332 A1* | 4/2010 | Takahashi | G06F 3/0436 |
| | | | 345/177 |
| 2010/0097345 A1* | 4/2010 | Jang | G06F 3/0416 |
| | | | 345/174 |
| 2010/0188371 A1 | 7/2010 | Lowles et al. | |
| 2010/0268089 A1* | 10/2010 | Degertekin | G01N 29/2406 |
| | | | 600/467 |
| 2011/0254762 A1 | 10/2011 | Dahl et al. | |
| 2011/0279410 A1 | 11/2011 | Han et al. | |
| 2011/0292020 A1 | 12/2011 | Lee | |
| 2012/0111119 A1 | 5/2012 | Small et al. | |
| 2012/0269031 A1 | 10/2012 | Huffman et al. | |
| 2012/0274609 A1 | 11/2012 | Sheng et al. | |
| 2013/0013248 A1* | 1/2013 | Brugler | G06F 11/3082 |
| | | | 702/130 |
| 2013/0135248 A1 | 5/2013 | Yang | |
| 2013/0141344 A1 | 6/2013 | Oh | |
| 2013/0235698 A1* | 9/2013 | Wong | B06B 1/02 |
| | | | 367/87 |
| 2014/0092068 A1 | 4/2014 | Zheng et al. | |
| 2015/0015515 A1 | 1/2015 | Dickinson et al. | |

OTHER PUBLICATIONS

Wodnicki, R., et al., "Highly Integrated Large Area Ultrasound Arrays," Joint AAPM/COMP Meeting Vancouver Powerpoint Slides, 2011, The American Assoication of Physicists in Medicine and the Canadian Organization of Medical Physicists, pp. 1-3.

Beutel, J., et al., "Handbook of Medical Imaging: Physics and psychophysics," Flat-pannel array technology, 2000, vol. 2, SPIE Press, Bellingham Washington, p. 267.

Kim, I., et al., "Portable High-Frequency Ultrasound Imaging System Design and Hardware Considerations," Integrated Microsystems: Electronics, Photonics, and Biotechnology, 2011, CRC press, Boca Raton, FL, pp. 338-339.

Kim, I., et al., "Fully Integrated CMOS Ultrasound Transceiver Chip for High-Frequency High-Resolution Ultrasonic Imaging Systems," A Dissertation in Electrical Engineering, Dec. 2009, Pennsylvania State University, pp. 1-143.

Kim, I., et al., "CMOS Ultrasound Transceiver Chip for High-Resolution Ultrasonic Imaging Systems," IEEE Transactions on Biomedical Circuits and Systems, Oct. 2009, vol. 3, No. 5, IEEE, Piscataway, NJ, pp. 293-303.

* cited by examiner

SENSOR ARRAY WITH RECEIVER BIAS ELECTRODE

I. CROSS-REFERENCE TO RELATED APPLICATIONS

The present disclosure claims priority from U.S. Provisional Patent Application No. 61/846,585, U.S. Provisional Patent Application No. 61/846,592, and U.S. Provisional Patent Application No. 61/846,604, each filed Jul. 15, 2013 and incorporated herein by reference in its entirety.

II. FIELD

The present disclosure is generally related to electronic devices and more particularly to electronic devices that utilize sensing techniques, such as ultrasonic sensing techniques for biometric sensor arrays.

III. DESCRIPTION OF RELATED ART

Advances in technology have resulted in smaller and more powerful electronic devices and communication systems. For example, there currently exist a variety of mobile devices, such as wireless telephones, personal digital assistants (PDAs), tablet computers, and paging devices. The mobile devices may be small, lightweight and easily carried by users. Wireless telephones, such as cellular telephones and Internet Protocol (IP) telephones, can communicate voice and data packets over wireless networks. Further, many wireless telephones include other types of devices that are incorporated therein. For example, a wireless telephone can also include a digital still camera, a digital video camera, a digital recorder, and an audio stream player. Also, wireless telephones can process executable instructions, including software applications such as a web browser application that can be used to access the Internet. As such, wireless telephones and other mobile devices can include significant computing capabilities.

Mobile devices typically include display devices that display graphical user interfaces (GUIs) and other information to users. Certain display devices include capacitive touch sensors that enable users to enter text, scroll, and perform other operations by interacting with (e.g., touching) the touchscreen of a display device. Certain display devices may include capacitance-based fingerprint sensors. However, the capacitive touch sensors and fingerprint sensors have certain limitations. For example, the resolution of capacitive touch sensors may be limited and the touch sensors may be unable to detect detailed features of a fingerprint, particularly through a cover glass of a display. To increase resolution, capacitive fingerprint sensors may include a thin platen or no platen at all for relatively close access to the tip of a finger. However, such capacitive devices may be incompatible with certain mobile device configurations (e.g., a relatively thick glass display or a display that occupies a large portion of the mobile device area, leaving little room for a dedicated fingerprint sensor).

IV. SUMMARY

An ultrasonic sensor array includes a receiver bias electrode. During operation of the sensor array, the receiver bias electrode may be responsive to a receiver bias voltage, and a value of the receiver bias voltage may be adjusted between a block value and a sample value. To illustrate, the sensor array may include a piezoelectric transmitter layer that generates an ultrasonic wave and may further include a piezoelectric receiver layer that may detect a reflection of the ultrasonic wave (e.g., from a finger of a user). In this example, the receiver bias voltage may have the block value while the ultrasonic wave is generated and may transition to the sample value while a reflection of the ultrasonic wave is detected.

In an illustrative implementation, transitioning the receiver bias voltage enables the piezoelectric transmitter layer and the piezoelectric receiver layer to have a "stacked" configuration, such as by forming the piezoelectric receiver layer above the piezoelectric transmitter layer. For example, by transitioning the receiver bias voltage to the block value during generation and transmission of the ultrasonic wave, the receiver bias electrode may inhibit the sensor array from detecting the outgoing ultrasonic wave that does not contain image content. After generating the ultrasonic wave, the receiver bias voltage may be transitioned to the sample value to enable the piezoelectric receiver layer to detect (e.g., sample) a reflection of the ultrasonic wave.

Because the piezoelectric transmitter layer may be positioned below the piezoelectric receiver layer (and below a substrate on which the piezoelectric receiver layer is formed) within a sensor or a display device, an ultrasonic wave can be measured more accurately as compared to a device that includes a transmitter and receiver in a side-by-side arrangement. For example, by "stacking" the piezoelectric transmitter layer and the piezoelectric receiver layer, an ultrasonic wave may be transmitted perpendicularly to a surface of a platen or display device, and a reflection of the ultrasonic wave that is perpendicular to the surface of the platen or display device can be received directly at the piezoelectric receiver layer. Thus, performance is improved compared to a device in which a transmitter and a receiver are positioned side-by-side, as the wavefront of the reflected wave in the stacked configuration strikes all portions of the piezoelectric receiver layer at substantially the same time for accurate detection and acquisition of image information.

In another illustrative implementation, an integrated circuit for operating the sensor array is disclosed. In some implementations, the integrated circuit may be referred to as a controller chip or simply as a controller. In a particular embodiment, the integrated circuit corresponds to an application-specific integrated circuit (ASIC) that is configured to drive the sensor array, to receive sensed data from the sensor array, and to provide the sensed data in some form to a processor (e.g., an applications processor of a mobile device). The sensor array may be mounted in a display device and may be responsive to user interactions. For example, the sensor array may transmit an ultrasonic wave based on a control signal received from the integrated circuit. The ultrasonic wave may be reflected from an object (e.g., a finger of a user). The reflected wave may be received at the sensor array, and at least one data sample may be provided to the integrated circuit from the sensor array. The integrated circuit may digitize the data sample and provide the digitized data sample to a processor. In a particular embodiment, the integrated circuit is configured to operate the sensor array and to provide data sensed from the sensor array to the applications processor.

In a particular embodiment, a method of operating an ultrasonic sensor array includes receiving a receiver bias voltage at a receiver bias electrode of the ultrasonic sensor array to bias piezoelectric sensor elements of the ultrasonic sensor array. The method further includes receiving a transmitter control signal at the ultrasonic sensor array to cause an ultrasonic transmitter of the ultrasonic sensor array to generate an ultrasonic wave. The method further includes generating data samples based on a reflection of the ultrasonic wave. The receiver bias voltage and the transmitter control signal are received from an integrated circuit that is coupled to the ultrasonic sensor array. The receiver bias voltage may have a hold value during a first time interval that is prior to a main burst of the ultrasonic wave. The receiver bias voltage has a block value during a second time interval associated with the main burst of the ultrasonic wave. The receiver bias voltage has a sample value during a third time interval associated with a reflection of the ultrasonic wave. The receiver bias voltage may have the block value during a fourth time interval associated with a bounce of the reflection of the ultrasonic wave. In one or more other implementations, one or more bounces may be detected by the piezoelectric sensor elements while the receiver bias voltage has the sample value (e.g., to enable detection of additional image information indicated by the bounces).

In another particular embodiment, an apparatus includes piezoelectric sensor elements of an ultrasonic sensor array and a receiver bias electrode. The receiver bias electrode is configured to receive a receiver bias voltage to bias the piezoelectric sensor elements of the ultrasonic sensor array. The apparatus further includes an ultrasonic transmitter configured to receive a transmitter control signal to cause the ultrasonic transmitter to generate an ultrasonic wave. The ultrasonic sensor array is configured to generate data samples based on a reflection of the ultrasonic wave. The receiver bias voltage and the transmitter control signal are received from an integrated circuit that is coupled to the ultrasonic sensor array. The receiver bias voltage may have a hold value during a first time interval that is prior to a main burst of the ultrasonic wave. The receiver bias voltage has a block value during a second time interval associated with the main burst of the ultrasonic wave and a sample value during a third time interval associated with a reflection of the ultrasonic wave. The receiver bias voltage may have the block value during a fourth time interval associated with a bounce of the reflection of the ultrasonic wave.

In another particular embodiment, an apparatus includes means for biasing piezoelectric sensor elements of an ultrasonic sensor array using a receiver bias voltage and means for generating an ultrasonic wave based on a transmitter control signal received at the ultrasonic sensor array. The apparatus further includes means for generating data samples based on a reflection of the ultrasonic wave. The receiver bias voltage and the transmitter control signal are received from an integrated circuit that is coupled to the ultrasonic sensor array. The receiver bias voltage may have a hold value during a first time interval that is prior to a main burst of the ultrasonic wave. The receiver bias voltage has a block value during a second time interval associated with the main burst of the ultrasonic wave and has a sample value during a third time interval associated with a reflection of the ultrasonic wave. The receiver bias voltage may have the block value during a fourth time interval associated with a bounce of the reflection of the ultrasonic wave.

In another particular embodiment, a computer-readable medium stores instructions executable by a processor to cause the processor to initiate operations. The operations include providing a receiver bias voltage to a receiver bias electrode of an ultrasonic sensor array. The operations further include providing a first signal to the ultrasonic sensor array. A second signal is received from the ultrasonic sensor array. The processor is included in an integrated circuit that is coupled to the ultrasonic sensor array. The receiver bias voltage may have a hold value during a first time interval that is prior to a main burst of an ultrasonic wave that is generated based on the first signal. The receiver bias voltage has a block value during a second time interval associated with the main burst of the ultrasonic wave, and the receiver bias voltage has a sample value during a third time interval associated with a reflection of the ultrasonic wave. The second signal is generated based on the reflection of the ultrasonic wave. The receiver bias voltage may have the block value during a fourth time interval associated with a bounce of the reflection of the ultrasonic wave.

One particular advantage provided by at least one of the disclosed embodiments is that user input can be accurately detected with a display device, such as a touchscreen device. For example, by enabling transmission and reception of ultrasonic signals that are perpendicular (or substantially perpendicular) to a surface of the display device, operation may be improved as compared to a surface acoustic wave (SAW) touch-sensing device in which signals are transmitted across a display surface. In a SAW touch-sensing device, a finger of a user may distort ultrasonic signals, such as by causing phase delay and/or damping of the ultrasonic signals. Transmitting and receiving ultrasonic signals substantially perpendicular relative to a surface of a display device may enable more accurate measurements of user interactions as compared to SAW devices and other devices, which may facilitate user fingerprint detection and recognition, as an illustrative example. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
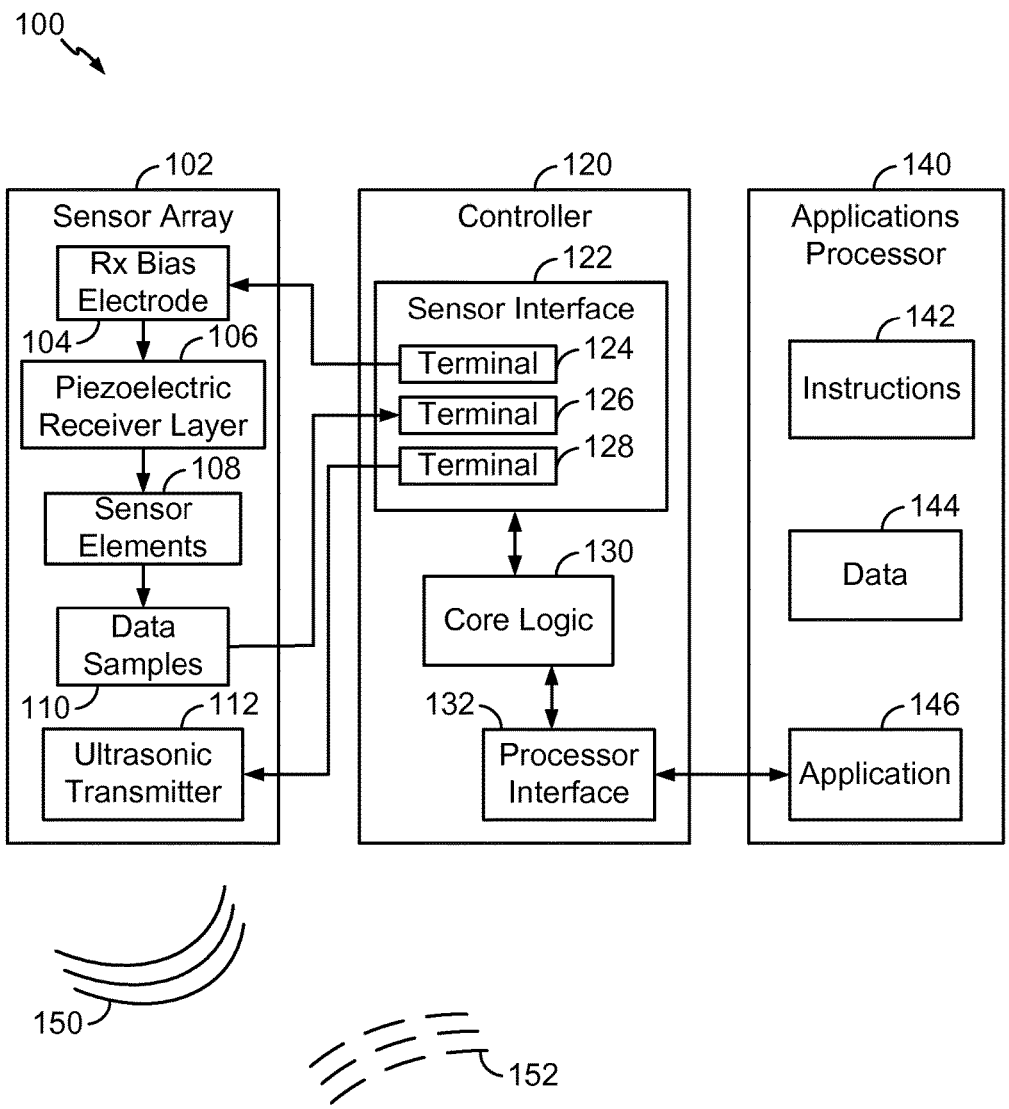
FIG. 1 is a diagram of a system that includes an ultrasonic sensor array having a receiver bias electrode coupled to a piezoelectric receiver layer.

Referring to FIG. 1, a system 100 may include an ultrasonic sensor array 102, a controller 120, and an applications processor 140. The controller 120 may correspond to an integrated circuit (IC) such as an application-specific integrated circuit (ASIC), to components on one or more printed circuit boards, substrates or flexible printed circuits, or to part of another controller such as the applications processor 140. In a particular embodiment, the system 100 is integrated within an enclosure of a mobile device. For example, the sensor array 102 and the controller 120 may be integrated within or coupled to a visual display of the mobile device. In another example, the sensor array 102 and controller 120 may form part of an ultrasonic fingerprint sensor array, biometric sensor, button or touchpad, which may be included within an enclosure of the mobile device such as on an enclosure backside, sidewall, or front side near a display of the mobile device.

The sensor array 102 may include a receiver (Rx) bias electrode 104, a piezoelectric receiver layer 106, an array of piezoelectric sensor elements 108, and an ultrasonic transmitter (Tx) 112. The piezoelectric sensor elements 108, also referred to as "sensor elements, "sensor pixels" or simply "pixels", may include thin-film transistors (TFTs) and other active and passive devices. In a particular embodiment, the ultrasonic sensor array 102 is configured to be coupled to an integrated circuit, such as an application-specific integrated circuit (ASIC). The integrated circuit may be operable to control or drive the ultrasonic sensor array 102. The integrated circuit may correspond to the controller 120.

The controller 120 may be coupled to the sensor array 102. The controller 120 may include a sensor interface 122, core logic 130, and a processor interface 132. The sensor interface 122 may include terminals 124, 126 and 128.

The applications processor 140 may be coupled to the controller 120. The applications processor 140 may execute instructions 142 and may store or access data 144. The applications processor 140 may execute one or more applications that cause the applications processor 140 to communicate with the controller 120. For example, the applications processor 140 may execute an application 146.

During operation, the controller 120 may control one or more operations of the sensor array 102, such as in response to commands received from the applications processor 140 via the processor interface 132. In an illustrative implementation, the controller 120 is configured to selectively initiate a hold mode of operation, a block mode of operation, and a sample mode of operation at the sensor array 102 by selectively biasing the piezoelectric sensor elements 108. For example, a bias voltage applied to the receiver bias electrode 104 may have a hold value to cause the piezoelectric sensor elements 108 to maintain a current value (e.g., to "hold" a current value). As another example, the bias voltage may have a block value to inhibit the piezoelectric sensor elements 108 from acquiring signals (e.g., to "block" the piezoelectric sensor elements 108 from acquiring signals). As another example, the bias voltage may have a sample value to cause the piezoelectric sensor elements 108 to detect ultrasonic waves (e.g., to "sample" the ultrasonic waves).

To illustrate, the controller 120 may initiate the hold mode while ultrasonic sensing operations are not being performed at the sensor array 102, such as while awaiting commands from the applications processor 140. The controller 120 may initiate the block mode during generation and transmission of ultrasonic waves by the ultrasonic transmitter 112. To initiate generating of an ultrasonic wave, the controller 120 may provide one or more transmitter control signals to the ultrasonic transmitter 112 via the terminal 128.

In response to the transmitter control signal, the ultrasonic transmitter 112 may generate an ultrasonic wave 150. The ultrasonic wave 150 may include a "main burst," such as an initial transmission of the ultrasonic wave 150 prior to reflection from one or more surfaces or objects. After the main burst, the ultrasonic wave 150 may be reflected from an object, such as a stylus and/or a finger of a user. For example, the ultrasonic wave 150 may be used to detect user gestures, such as in connection with a multi-touch user input action at a display device that includes or that is coupled to components of the system 100. In another example, the generated ultrasonic wave 150 may be used to image the ridges and valleys of a fingerprint. In general, the ultrasonic wave 150 may include one or more cycles of ultrasonic waves, each of which may include waves at one or more frequencies or amplitudes.

A portion of the ultrasonic wave 150 may be reflected from an object or surface to generate a reflection of the ultrasonic wave 150, such as a reflected ultrasonic wave 152. The reflected ultrasonic wave 152 of the ultrasonic wave 150 may be detected by the piezoelectric receiver layer 106 and the piezoelectric sensor elements 108. To illustrate, the piezoelectric receiver layer 106 may include one or more thin film materials. An ultrasonic wave may mechanically stress (e.g., deform or bend) the one or more thin film materials, and the piezoelectric receiver layer 106 may generate surface charges in response to the mechanical stress. The piezoelectric sensor elements 108 may be responsive to the surface charges to generate data output signals, which may correspond to the data samples 110 of FIG. 1. To enable detection of the reflected ultrasonic wave 152, the controller 120 may transition the sensor array 102 from the block mode to the sample mode.

During the sample mode of operation, the sensor array 102 may detect the reflected ultrasonic wave 152. For example, the piezoelectric sensor elements 108 may sample the reflected ultrasonic wave 152 to generate, acquire or store data samples 110. The controller 120 may access the data samples 110 via the sensor interface 122. The controller 120 may perform one or more pre-processing operations using the data samples 110. For example, the core logic 130 may digitize the data samples 110 to generate a digital representation of the data samples 110, and the controller 120 may provide the digital representation to the applications processor 140 via the processor interface 132. The applications processor 140 may utilize the digital representation, such as in connection with execution of the application 146.

Although the ultrasonic wave 150 and the reflected ultrasonic wave 152 are illustrated in FIG. 1 as being below the sensor array 102 for convenience of illustration, it is noted that the ultrasonic wave 150 and the reflected ultrasonic wave 152 may be transmitted perpendicularly or substantially perpendicularly with respect to the plane of FIG. 1

(i.e., in the "z" direction). In some implementations, the generated ultrasonic wave 150 is transmitted through the sensor array 102 and an attached platen or cover glass. The ultrasonic wave 150 may be partially reflected off of an outer surface of the platen or cover glass (e.g., to generate the reflected ultrasonic wave 152). The reflected ultrasonic wave 152 may travel back towards the piezoelectric receiver layer 106 and the sensor elements 108. The reflected ultrasonic wave 152 may have an amplitude of the reflected ultrasonic wave 152 dependent on material properties of an object such as a finger or stylus positioned against the outer surface, as described in more detail with respect to FIG. 3.

The example of FIG. 1 illustrates that the sensor array 102 can be controlled to increase accuracy of ultrasonic sensing operations. For example, by transitioning the sensor array 102 to the block mode via the receiver bias electrode 104 during generation and transmission of the ultrasonic wave 150 through the sensor array 102 prior to reflection off of an outer surface, generation of spurious signals by the piezoelectric sensor elements 108 can be reduced or avoided.

In addition, operation may be enhanced using the controller 120 to control ultrasonic sensing operations at the sensor array 102. Because the controller 120 performs one or more operations that may be performed by discrete components (e.g., custom circuitry for operating ultrasonic sensor arrays), operation of the system 100 is simplified as compared to systems that utilize many discrete components. For example, custom circuitry may be cumbersome, bulky, costly, and/or unable to fit into the enclosure of a mobile device. The custom circuitry may be particularly cumbersome in the case of a mobile device with a small form factor. Further, ultrasonic sensing operations may be more compatible with small mobile devices with glass display covers as compared to capacitive touch sensors or fingerprint sensors. Therefore, the controller 120 may enable efficient control of ultrasonic sensing operations in connection with a mobile device.

Figure 2A:
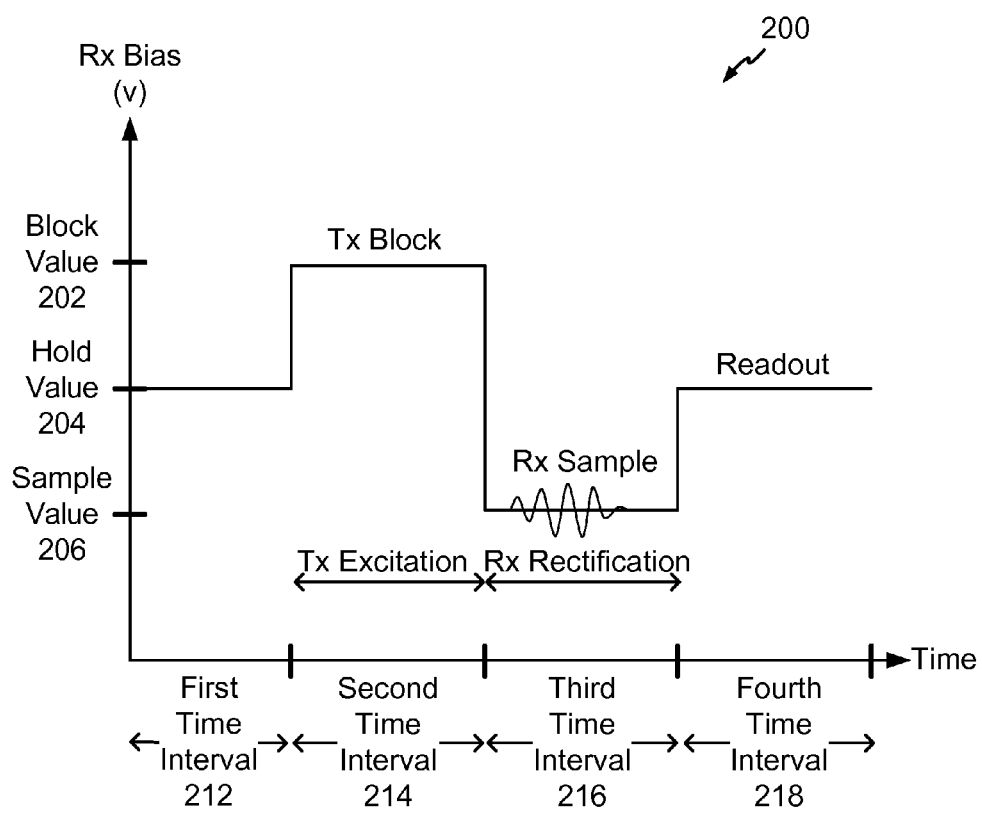
FIG. 2A is a timing diagram that depicts example voltages that may be applied to the receiver bias electrode of FIG. 1.

FIG. 2A depicts a sample timing diagram 200 illustrating example states of a receiver bias voltage applied to the receiver bias electrode 104 of FIG. 1. The timing diagram 200 depicts an abscissa indicating time and further depicts an ordinate indicating values (e.g., voltages). The example values may include a block value 202, a hold value 204, and a sample value 206. In the timing diagram 200, the block value 202 is greater than the hold value 204, and the hold value 204 is greater than the sample value 206.

The receiver bias voltage may have the hold value 204 during a first time interval 212. The first time interval 212 may correspond to a time period during which ultrasonic waves are not being transmitted or received at the sensor array 102. The piezoelectric sensor elements 108 may operate in a hold mode (e.g., a standby or "ready" mode) while the receiver bias voltage has the hold value 204. The receiver bias voltage may have one or more other values, such as a low value (e.g., zero volts or approximately zero volts) during a power down state of the ultrasonic sensor array 102 of FIG. 1.

The receiver bias voltage may have the block value 202 during a second time interval 214. The block value 202 may cause the piezoelectric sensor elements 108 to operate in a block mode during which generation of signals by the piezoelectric sensor elements 108 is inhibited ("Tx Block"). While the receiver bias voltage has the block value 202, the controller 120 of FIG. 1 may cause the ultrasonic transmitter 112 to generate an ultrasonic wave 150 ("Tx Excitation"). For example, the controller 120 may assert a transmitter control signal at the terminal 128 that causes the ultrasonic transmitter 112 to generate and transmit the ultrasonic wave 150.

After generation and transmission of the ultrasonic wave 150 by the ultrasonic transmitter 112, the controller 120 may transition the receiver bias voltage to the sample value 206 during a third time interval 216 ("Rx Rectification"). The sample value 206 may cause the piezoelectric sensor elements 108 to operate according to a sample mode of operation during which the piezoelectric sensor elements 108 generate voltages in response to ultrasonic waves, such by detecting (e.g., sampling) the reflected ultrasonic wave 152 to generate the data samples 110 ("Rx Sample").

After generating the data samples 110, the controller 120 may transition the receiver bias voltage to the hold value 204 during a fourth time interval 218. In a particular embodiment, the controller 120 accesses the data samples 110 during the fourth time interval 218 via the sensor interface 122 ("Readout").

Depending on the particular implementation, the receiver bias voltage may transition from the hold value 204 to the block value 202 during the fourth time interval 218 (e.g., while the data samples 110 of FIG. 1 are accessed by the controller 120). For example, in some cases, the reflected ultrasonic wave 152 may "bounce" or otherwise be reflected from an object, such as from a surface of the sensor array 102 or from a surface of a display device that includes the sensor array 102. In this case, the receiver bias voltage may transition from the hold value 204 to the block value 202 during the fourth time interval 218, which may be advantageous in applications in which the ultrasonic wave 150 has a large amplitude (and is likely to cause multiple internal reflections or "bounces"). An illustrative example of transitioning the receiver bias voltage from a hold value to a block value during a fourth time interval is described further with reference to FIG. 2B. In other cases, the receiver bias voltage is not transitioned to the block value 202 during the fourth time interval 218, such as in the illustrative example of FIG. 2A.

The example of FIG. 2A illustrates a method of operating a sensor array, such as the sensor array 102 of FIG. 1. For example, when the receiver bias voltage applied to the receiver bias electrode 104 has the block value 202 during generation of the ultrasonic wave 150, the piezoelectric sensor elements 108 may be inhibited from generating, acquiring or storing voltages responsive to the generation, transmission or reception of the ultrasonic wave 150. Thus, reception of "noise" and/or spurious signals is reduced.

Figure 2B:
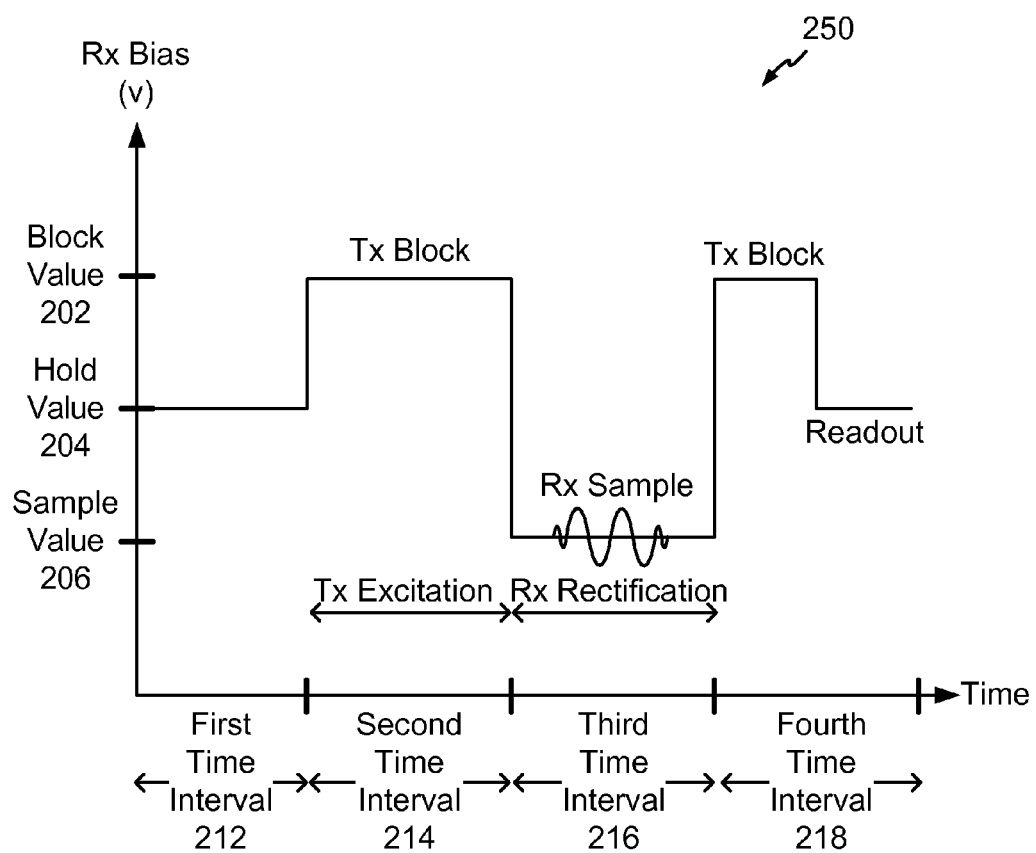
FIG. 2B is another timing diagram that depicts example voltages that may be applied to the receiver bias electrode of FIG. 1.

FIG. 2B depicts another sample timing diagram 250 illustrating example states of a receiver bias voltage applied to the receiver bias electrode 104 of FIG. 1. The timing diagram 250 depicts an abscissa indicating time and further depicts an ordinate indicating values (e.g., voltages). The example values may include the block value 202, the hold value 204, and the sample value 206 described with reference to FIG. 2A. In addition, the timing diagram 250 includes the time intervals 212, 214, 216, and 218 of FIG. 2A.

FIG. 2B illustrates that the receiver bias voltage may transition from the block value 202 to the hold value 204 during the fourth time interval 218 (e.g., while the data samples 110 of FIG. 1 are accessed by the controller 120). For example, in some cases, the reflected ultrasonic wave 152 may "bounce" or otherwise be reflected from an object, such as from a surface of the ultrasonic sensor array 102 or from a surface of a display device that includes the ultrasonic sensor array 102. In this case, the receiver bias voltage may transition from the block value 202 to the hold value 204 during the fourth time interval 218, which may be advantageous in applications in which the ultrasonic wave 150 has a large amplitude (and is likely to cause multiple internal reflections or "bounces").

Thus, the timing diagram 250 of FIG. 2B illustrates transition of a receiver bias voltage from a block value (the block value 202) to a hold value (the hold value 204) during a readout procedure. In certain applications, transitioning the receiver bias voltage to the block value 202 may reduce reception of bounces of a reflected ultrasonic wave, which may improve a signal-to-noise ratio (SNR) of a signal (since for example in some applications a bounce may have a high noise content). In some applications, a sampling time in the third time interval 216 ("Rx Sample") occurring between a first block mode during the second time interval 214 ("Tx Block") and a second block mode during the fourth time interval 218 ("Tx Block") has a relatively short duration. The relatively short duration of the sampling time may enable sampling of signal levels associated with the reflected ultrasonic wave 152 at a predetermined time interval after generation of the ultrasonic wave 150, which may be helpful in generating images at varying depths into a finger or other object on the surface of the sensor array 102, for example.

Figure 3:
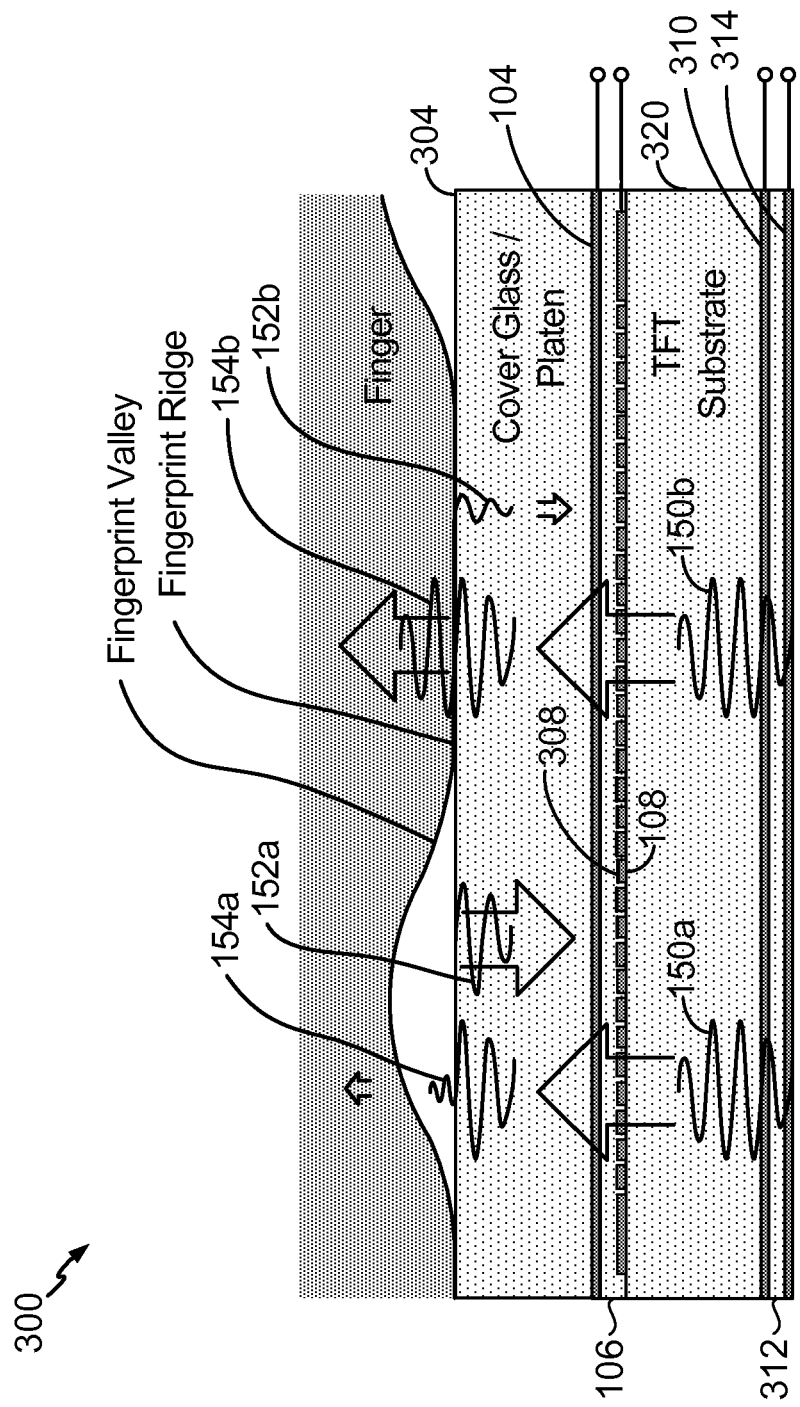
FIG. 3 depicts a cross-sectional view of a device, such as the sensor array of FIG. 1.

FIG. 3 depicts a cross-sectional view of a device 300. In a particular embodiment, the device 300 corresponds to the sensor array 102 of FIG. 1. For example, FIG. 3 depicts that the device 300 may include the receiver bias electrode 104, the piezoelectric receiver layer 106, and the piezoelectric sensor elements 108 of FIG. 1. In the example of FIG. 3, the piezoelectric sensor elements 108 may correspond to thin-film transistor (TFT) circuits.

The device 300 may include a TFT substrate 320. The piezoelectric sensor elements 108 with pixel input electrodes 308 may be formed on the TFT substrate 320. The TFT substrate 320, the piezoelectric sensor elements 108, the piezoelectric receiver layer 106, and the receiver bias electrode 104 may be coupled to a platen or cover glass 304 (e.g., a cover glass or cover lens of a mobile device). In some implementations, the cover glass 304 may serve as a platen. A piezoelectric transmitter layer 312 may be coupled to a first transmitter electrode 310, a second transmitter electrode 314, and the TFT substrate 320. The piezoelectric transmitter layer 312 and the transmitter electrodes 310, 314 may correspond to (e.g., may include) the ultrasonic transmitter 112 of FIG. 1. One or both of the transmitter electrodes 310, 314 may be segmented. In at least one embodiment, neither of the transmitter electrodes 310, 314 is segmented. The transmitter electrodes 310, 314 may be formed on opposite sides of the piezoelectric transmitter layer 312. Adhesive layers may be used to adhere or attach some of the layers to other layers (not shown).

In the example of FIG. 3, the TFT substrate 320 and the piezoelectric sensor elements 108 with pixel input electrodes 308 may be coupled to the piezoelectric receiver layer 106 and to the receiver bias electrode 104. The pixel input electrodes 308 may transfer charge/voltage generated by the piezoelectric receiver layer 106 upon impingement of an ultrasonic wave to the piezoelectric elements 108. The piezoelectric receiver layer 106 may have a thickness that corresponds to a particular application. According to various embodiments, the thickness of the piezoelectric receiver layer 106 may be between about 5 micrometers (μm) and about 100 μm, as illustrative examples.

In operation, the piezoelectric transmitter layer 312 may be responsive to signals applied to the transmitter electrodes 310, 314. For example, application of voltages across one or more of the transmitter electrodes 310, 314 may cause the piezoelectric transmitter layer 312 to emit an ultrasonic wave. The emitted ultrasonic wave may be a plane wave (or substantially a plane wave). The ultrasonic wave may be transmitted substantially perpendicularly to a surface of the piezoelectric transmitter layer 312 and to a surface of the platen or cover glass 304. The ultrasonic wave may be reflected from an outer surface of the platen or cover glass 304 and from an object placed on the surface, such as a finger of a user (e.g., a fingerprint valley or a fingerprint ridge as illustrated in FIG. 3). Alternatively, the ultrasonic wave may be reflected from another object, such as a stylus. The intensity of the reflected wave from the surface of the platen or cover glass depends in part on the acoustic impedance mismatch between the object and the platen or cover glass materials. As illustrated in FIG. 3, an emitted ultrasonic wave 150*a* passes through TFT substrate 320 and the piezoelectric receiver layer 106 and strikes an outer surface of the platen or cover glass 304. In the region of a fingerprint valley, a large portion of the incident ultrasonic wave 150*a* is reflected (152*a*) and a smaller portion is transmitted (154*a*) through the outer surface, due in part to the relatively large acoustic mismatch with air. In the region of a fingerprint ridge, a lesser portion of an incident ultrasonic wave 150*b* is reflected (152*b*) and a larger part is transmitted (154*b*), due in part to the reduced mismatch between the acoustic impedance of the fingerprint ridge and the platen or cover glass 104.

The reflected portion of the ultrasonic wave may propagate back through the platen or cover glass 304 and may be received at the piezoelectric receiver layer 106. The piezoelectric receiver layer 106 may generate a surface charge based on the magnitude and sign of the reflection and may provide the charge to the piezoelectric sensor elements 108 via the pixel input electrodes 308. The TFT circuitry in the sensor elements 108 may convert the charge generated by the piezoelectric receiver layer 106 to a voltage indicative of the level of generated surface charge. To illustrate, the one or more voltages may correspond to the data samples 110 of FIG. 1, and the data samples 110 may be sensed from the piezoelectric sensor elements 108 by the controller 120 of FIG. 1.

The techniques illustrated with reference to FIG. 3 may enable user interaction with a display device having a relatively thin platen or cover glass. For example, user interactions and/or user characteristics may be detected even when the platen or cover glass 304 has a thickness between about a half of a millimeter and several millimeters or more. Additionally, since the ultrasonic wave may be reflected by a finger of a user that has fingerprint ridge and fingerprint valley characteristics as illustrated in FIG. 3, the reflected ultrasonic wave may be used for fingerprint detection and/or recognition. As shown in FIG. 3, the piezoelectric receiver layer 106 is positioned between the piezoelectric transmitter layer 312 and an outer surface of the platen or cover glass 304. In other configurations, the piezoelectric transmitter layer 312 may be positioned between the piezoelectric receiver layer 106 and the outer surface of the platen or cover glass 304. Among other configurations, the piezoelectric transmitter layer 312 and the piezoelectric receiver layer 106 may be on the same side of the TFT substrate 320.

Figure 4:
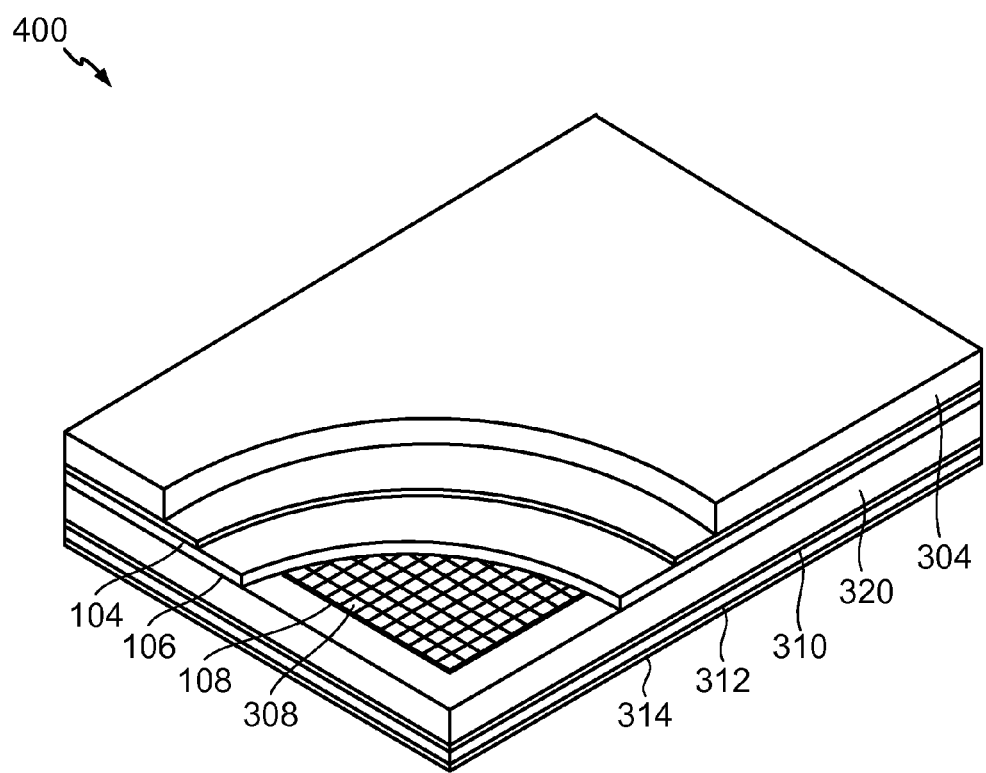
FIG. 4 depicts a partial perspective cross-sectional view of a device, such as the sensor array of FIG. 1.

FIG. 4 depicts a partial perspective cross-sectional view of a device 400. One or more components of the device 400 may be as described with reference to the sensor array 102 of FIG. 1 and/or the device 300 of FIG. 3. For example, FIG. 4 illustrates that the device 400 may include the receiver bias electrode 104, the piezoelectric receiver layer 106, the piezoelectric sensor elements 108 with pixel input electrodes 308, the platen or cover glass 304, the piezoelectric transmitter layer 312 and associated electrodes 310, 314, and the TFT substrate 320. FIG. 4 illustrates partial cut-away views of the receiver bias electrode 104, the piezoelectric receiver layer 106, and the platen or cover glass 304 for clarity of illustration. The device 400 may include one or more other components that are omitted from FIG. 4 for clarity. For example, the device 400 may include the input electrodes 308 of FIG. 3 and bonding adhesives between various layers.

In the example of FIG. 4, the receiver bias electrode 104 corresponds to or includes a metal or otherwise conductive layer formed in the device 400. In this example, the receiver bias electrode 104 may correspond to a single monolithic structure, such as a single metal layer formed using a metal deposition or screen-printing technique on a surface of the piezoelectric receiver layer 106. In other examples, the receiver bias electrode 104 may include multiple layers that may be deposited using multiple deposition steps or processes. The receiver bias electrode 104 and piezoelectric receiver layer 106 may be adjacent to the piezoelectric sensor elements 108 on the TFT substrate 320. In some implementations, the piezoelectric receiver layer 106 may be in direct contact with the pixel input electrodes 308 of the piezoelectric sensor elements 108. In some implementations, the piezoelectric receiver layer 106 may be capacitively coupled to the pixel input electrodes 308 of the piezoelectric sensor elements 108, such as with a thin adhesive applied between the lower surface of the piezoelectric receiver layer 106 and the pixel input electrodes 308 of the piezoelectric sensor elements 108.

To further illustrate, the receiver bias electrode 104 may include one or more conductive materials, such as one or more metals (e.g., aluminum, copper, or nickel on copper) and/or one or more metal alloys (e.g., an aluminum or copper alloy). One or more conductive materials may be deposited using a conformal or non-conformal deposition technique. One or more conductive materials may be deposited using an electrochemical deposition process, as an illustrative example. Depending on the particular application, deposited materials may be defined using an etch process and/or a planarization process, such as a chemical-mechanical planarization (CMP) process. For example, the deposited materials may be planarized to enable the platen or cover glass 304 to be connected to the receiver bias electrode 104. In another example, the receiver bias electrode 104 may be formed from a mixture of polyurethane and silver or other materials, which may be screened onto a surface of the piezoelectric receiver layer 106.

In operation, the receiver bias electrode 104 may be responsive to the controller 120. For example, the receiver bias electrode 104 may be responsive to the receiver bias voltage described with reference to the timing diagram 200 of FIG. 2A. The receiver bias electrode 104 may be configured to aid in biasing one or more TFTs in each of the underlying piezoelectric sensor elements 108. In some implementations, the voltage applied to the receiver bias electrode 104 is capacitively coupled to the piezoelectric sensor elements 108.

FIG. 4 illustrates that the receiver bias electrode 104 may have a "plate" or metal layer configuration that enables capacitive coupling of the receiver bias voltage to each piezoelectric sensor element 108. As a result, piezoelectric sensor elements 108 can be biased effectively (e.g., by "uniformly" or approximately uniformly biasing each piezoelectric sensor element 108 with a common voltage). Further, because a common bias voltage may be applied to each piezoelectric sensor element 108, the receiver bias electrode 104 may have a monolithic (or "plate") configuration. For example, the receiver bias electrode may be formed in a single metal layer of the device 400 using a simple metal deposition or screening technique, as an illustrative example.

Figure 5:
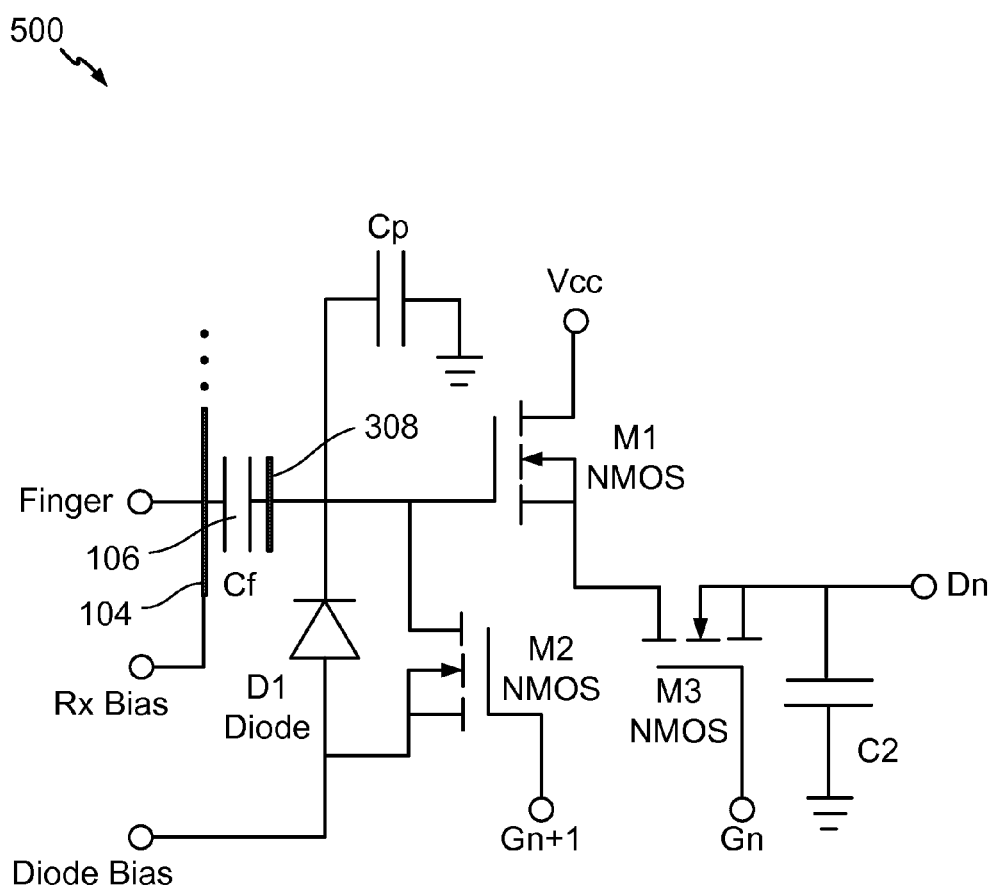
FIG. 5 illustrates an example of a piezoelectric sensor element that may be included in the sensor array of FIG. 1.

FIG. 5 illustrates an example of a piezoelectric sensor element 500. The piezoelectric sensor element 500 or sensor pixel may be included in the sensor array 102 of FIG. 1. In a particular embodiment, each of the piezoelectric sensor elements 108 of FIG. 1 may correspond to the piezoelectric sensor element 500. Because the piezoelectric sensor element 500 operates based on piezoelectricity, the piezoelectric sensor element 500 may detect local reflections 152 of ultrasonic waves 150 transmitted by the ultrasonic transmitter 112 of FIG. 1.

In the example of FIG. 5, the piezoelectric sensor element 500 includes a capacitor Cf, a capacitor Cp, a diode D1, a transistor M1, a transistor M2, a transistor M3, and a capacitor C2. Each of the transistors M1, M2 and M3 may correspond to an n-type metal-oxide-semiconductor (NMOS) transistor. The diode D1 may correspond to a p-n type or a p-i-n diode, and may serve as a peak-detecting or rectifying diode (Diode). The capacitor Cf denotes the capacitance of the piezoelectric film or piezoelectric receiver layer 106 associated with each sensor element 500. For example, the capacitor Cf may denote the capacitance between the receiver bias electrode 104 and the pixel input electrode 308, with a portion of the piezoelectric receiver layer 106 serving as a dielectric layer positioned between the receiver bias electrode 104 and the pixel input electrode 308. The capacitor C2 represents an output capacitance (e.g., a column or row capacitance, depending on the particular configuration), and the capacitance may vary with the size and configuration of the sensor array. In the example of FIG. 5, the capacitors Cf and C2 may have capacitances of approximately 13 femtofarads (fF) and 10 picofarads (pF), respectively. It should be appreciated that the example of FIG. 5 is illustrative and that device parameters (such as capacitance values) may be selected or determined based on the particular application or layout of the sensor elements. Alternatively, each of the transistors M1, M2 and M3 may correspond to a p-type metal-oxide-semiconductor (PMOS) transistor, with adjustments to supply voltages and voltage values as needed for operation.

The transistor M1 may be responsive to a supply voltage (Vcc) for the sensor array. The supply voltage (Vcc) may also be referred to as the "array power" (AP). The transistor M1 may serve as a source follower, allowing a signal on the gate of M1 to be transferred to the pass transistor M3 and to the output Dn when the pass transistor M3 is turned on. The diode D1 and the source follower transistor M1 may be responsive to a diode bias voltage (diode bias or "DBIAS"). The DBIAS voltage level may be applied to the gate of M1 when the diode D1 is forward biased or when the reset transistor M2 is turned on. The reset transistor M2 may be coupled to a gate driver (Gn+1) for an adjacent (n+1) row or column of sensor elements (not shown), and the transistor M3 may be coupled to a gate driver (Gn) for an nth row or column (not shown).

For example, the reset transistor M2 may be turned on to reset the gate voltage on transistor M1 in a row or column n when the next (n+1) row or column is read out. The gate driver voltage Gn may activate (or "turn on") the pass transistor M3 to enable the signal voltage on the gate of M1 to be read out of the piezoelectric sensor element 500, while also resetting the gate of transistor M1 on a preceding (n−1) row or column (not shown). The diode D1 may be biased using a bias signal, such as the diode bias signal illustrated in FIG. 5, which may bias the diode D1 into a peak-detecting mode of operation or a rectification mode of operation, as illustrative examples. In a particular embodiment, the diode bias signal is generated by the controller 120 of FIG. 1. In other implementations, the diode bias signal is generated at another location, such as at the ultrasonic sensor array 102 of FIG. 1.

In operation, the piezoelectric sensor element 500 may be responsive to an ultrasonic wave passing through the sensor element, such as a reflected ultrasonic wave 152 of the ultrasonic wave 150 of FIG. 1. In the example of FIG. 5, the ultrasonic wave may be reflected from a finger (Finger) of a user placed on an outer surface of the sensor array. The reflection may generate a charge/voltage in accordance with a piezoelectric effect. For example, the reflection may cause dynamic tensile and compressive mechanical stresses to crystalline structures and/or ceramic structures of a piezoelectric device, such as the piezoelectric receiver layer 106, which may be coupled to the piezoelectric sensor element 500. Materials suitable for the piezoelectric receiver layer 106 include polyvinylidene fluoride (PVDF) or a copolymer of PVDF and trifluoroethylene (PVDF-TrFE). The mechanical stress may generate a surface charge or voltage that can be detected by the piezoelectric sensor element 500, such as by the rectifying diode D1. The rectified signal and the initial bias voltage on the gate of M1 may determine the gate voltage of transistor M1, which may be read out by turning on transistor M3 of the piezoelectric sensor element 500. In the example of FIG. 5, the parasitic capacitor Cp may shunt certain alternating current (AC) signals to ground, thus filtering certain signals (e.g., high frequency noise). The piezoelectric sensor element 500 may generate a data output signal (Dn) for the nth row or column having a magnitude or voltage indicating a strength of the reflected ultrasonic wave as detected by the piezoelectric sensor element 500. The data output signal (Dn) may correspond to one of the data samples 110 of FIG. 1.

In some implementations, the receiver bias electrode 104 and the piezoelectric receiver layer 106 may be capacitively coupled to the gate of transistor M1. A capacitive voltage divider is formed between Cf and the gate capacitance of transistor M1. Operation of the capacitive voltage divider may be further affected by the parasitic capacitances Cp and the capacitances associated with transistor M2 and diode D1. When a receiver bias voltage is applied to the receiver bias electrode 104, an M1 gate bias voltage is generated at the gate of the transistor M1 in accordance with the capacitive voltage divider network. For example, the M1 gate bias voltage may serve to bias transistor M1 in an "on" state. In a multi-level mode of operation, a "block" value or voltage applied to the receiver bias electrode 106 may bias the transistor M1 in a saturation mode that may cause voltages generated by the piezoelectric layer due to a passing ultrasonic wave to be blocked; a "sample" value or voltage applied to the receiver bias electrode 106 may bias and allow the voltage on the gate of M1 to respond to rectified signal voltages generated across the piezoelectric receiver layer 106; and a "hold" value or voltage applied to the receiver bias electrode 106 may bias the transistor M1 to operate in a linear mode and allow the sample voltage value on the gate of transistor M1 of piezoelectric sensor element 500 to be read out when desired.

In an alternative mode of operation, multiple levels of bias voltages may be applied to the diode bias (DBIAS) terminal of FIG. 5. These bias values may correspond to a hold value, a block value, and a sample value to allow operation in a ready or hold mode, a block mode, and a sample mode, respectively. In an illustrative implementation, the controller 120 may be configured to selectively initiate a hold mode of operation, a block mode of operation, and a sample mode of operation at the sensor array 102 by selectively biasing the DBIAS electrode of the piezoelectric sensor elements 108. For example, a bias voltage may have a hold value applied to the DBIAS electrode to cause the piezoelectric sensor elements 108 to maintain a current value (e.g., to "hold" a current value). The bias voltage may have a block value applied to the DBIAS electrode to inhibit the piezoelectric sensor elements 108 from acquiring or detecting signals (e.g., to "block" the piezoelectric sensor elements 108 from acquiring or detecting signals). The bias voltage may have a sample value applied to the DBIAS electrode to cause the piezoelectric sensor elements 108 to detect ultrasonic waves (e.g., to "sample" the ultrasonic waves). During these operational modes with DBIAS level control, the value applied to RBIAS (e.g. the receiver bias electrode 104) may be held constant or caused to vary in some implementations. The values and timing with DBIAS methods may vary from RBIAS methods of operating the sensor array 102, yet the functionality may be similar or substantially similar. In other implementations, functionality of DBIAS may be different than functionality of RBIAS. Other operational modes may vary either RBIAS values, DBIAS values, or both during operation.

Thus, a TFT pixel circuit (e.g., the piezoelectric sensor element 500) may include a diode (e.g., the diode D1) that is responsive to a diode bias signal (e.g., the diode bias signal of FIG. 5). The TFT pixel circuit may further include a first transistor, such as the transistor M1. The first transistor may be responsive to a receiver bias voltage via capacitive coupling. For example, a gate terminal of the first transistor may be capacitively coupled to the receiver bias electrode 104. The piezoelectric receiver layer 106 may be configured to generate a surface charge based on a reflected ultrasonic wave, such as based on the reflected ultrasonic wave 152. The diode and the first transistor may be responsive to the surface charge to generate a particular signal. The TFT pixel circuit may further include a second transistor, such as the transistor M3. The second transistor may be responsive to the particular signal to generate a data output signal of the TFT pixel circuit, such as the data output signal (Dn) of FIG. 5. The data output signal may be included in the data samples 110 of FIG. 1.

Figure 6A:
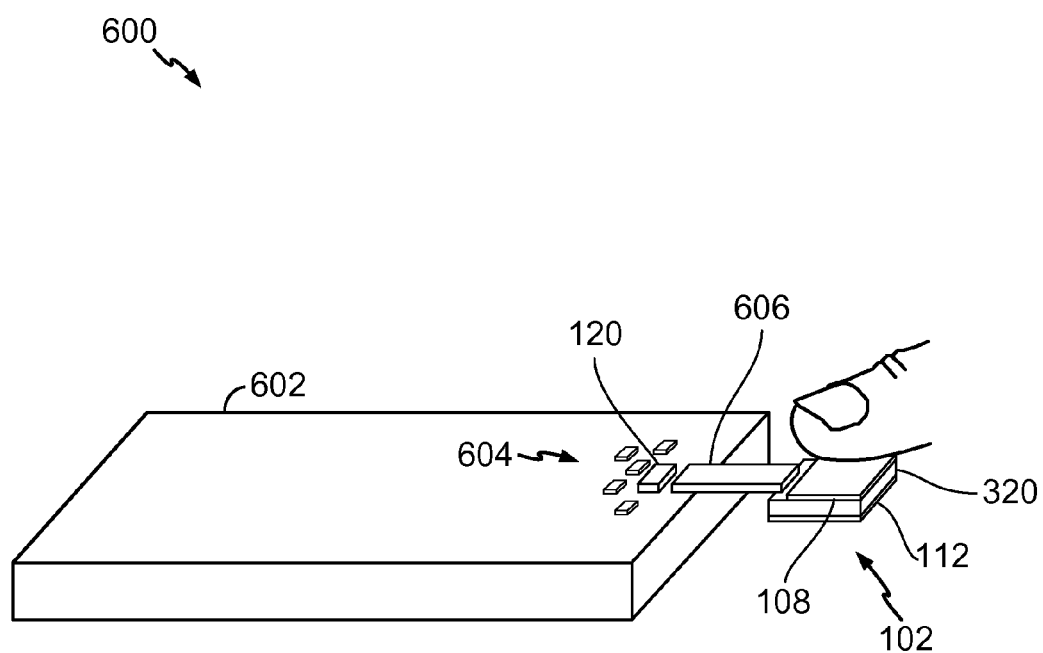
FIG. 6A is a diagram of a system that includes a sensor array, such as the sensor array of FIG. 1.

Referring to FIG. 6A, a particular illustrative embodiment of a system is depicted and generally designated 600. Certain components of the system 600 may be as described with reference to FIG. 1. For example, the system 600 may include the sensor array 102 and the controller 120. The sensor array 102 may include an array of piezoelectric sensor elements 108, the ultrasonic transmitter 112, and the TFT substrate 320 of FIG. 3.

The system 600 may further include a printed circuit board (PCB) 602, one or more additional components 604, and a flexible printed circuit (FPC) or flex circuit 606. The one or more additional components 604 may include one or more discrete resistors, capacitors, inductors, active devices, or integrated circuits (ICs). The one or more additional components 604 may include a processor, such as the applications processor 140 of FIG. 1. The applications processor 140 may execute one or more software applications, such as the application 146 of FIG. 1. One or more of the additional components 604 may be formed on or otherwise attached to the sensor array 102 (not shown in FIG. 6A).

The flex circuit 606 may operationally couple the sensor array 102 and the controller 120. The flex circuit 606 may contain isolated electrical traces that interface between the sensor array 102 and the controller 120. Alternatively, the controller 120 and/or the one or more additional components 604 may be attached to and electrically connected to the flex circuit 606. The flex circuit 606 may include one or more electrical layers to provide electrical shielding and enhanced connectivity. Traces on the flex circuit 606 may be configured as one or more capacitors or inductors. Components may be mounted on one or more portions or sides of the flex circuit 606. More than one flex circuit 606 or one or more other connective devices, such as wires, coaxial cable, or braided wire, may connect at least portions of the sensor array 102 to the PCB 602.

In operation, the controller 120 may communicate with the sensor array 102. For example, the controller 120 may cause the ultrasonic transmitter 112 to generate an ultrasonic wave, such as the ultrasonic wave 150 of FIG. 1. The ultrasonic wave may be reflected from an object, such as a stylus, finger, or fingertip of a user, as illustrated in FIG. 6A. The piezoelectric sensor elements 108 may generate signals in response to the reflected ultrasonic wave, such as the data samples 110. Signals generated by the piezoelectric sensor elements 108 may be received at the controller 120. The controller 120 may perform one or more operations using the signals received from the piezoelectric sensor elements 108 and may provide a signal to any of the additional components 604, such as to the applications processor 140 of FIG. 1. The sensor array 102 as shown in FIG. 6A has no separately attached platen or cover glass; a user may place a finger on a surface of the sensor array 102 such as the receiver bias electrode or a coating disposed thereon (not shown).

Figure 6B:
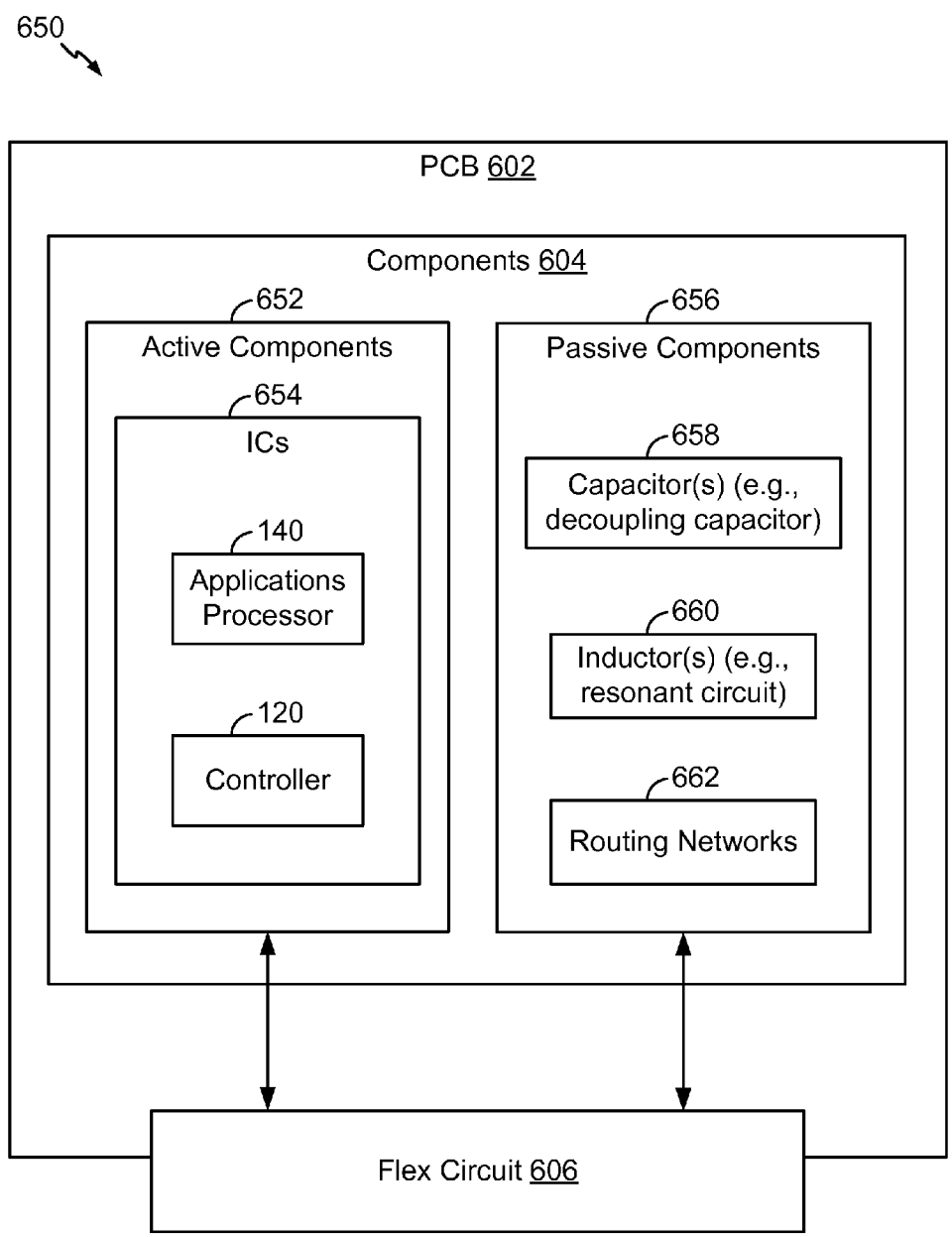
FIG. 6B is a diagram illustrating certain example components that may be included in the system of FIG. 6A.

Referring to FIG. 6B, a particular illustrative embodiment of a device is depicted and generally designated 650. The device 650 may be included within the system 600 of FIG. 6A. For example, the device 650 may include the PCB 602, the one or more additional components 604, and the flex circuit 606.

The one or more additional components 604 may include active components 652 and passive components 656. The active components 652 may include one or more integrated circuits (ICs) 654, which may include the controller 120 and the applications processor 140 of FIG. 1, as illustrative examples. The passive components 656 may include one or more capacitors 658 (e.g., a decoupling capacitor to filter out certain high frequency signals, such as noise signals). The passive components 656 may further include one or more inductors 660, such as a resonant circuit. An example of a resonant circuit is described further with reference to FIG. 10. The passive components 656 may further include routing networks 662 (e.g., routing traces).

Thus, FIGS. 6A and 6B illustrate example devices for ultrasonic sensing operations. Because the controller 120 may be "dedicated" to controlling the ultrasonic sensor array 102, resources at the applications processor 140 may be freed to perform other processing tasks. In a particular implementation, the controller 120 corresponds to or is implemented by use of an ASIC.

Figure 7:
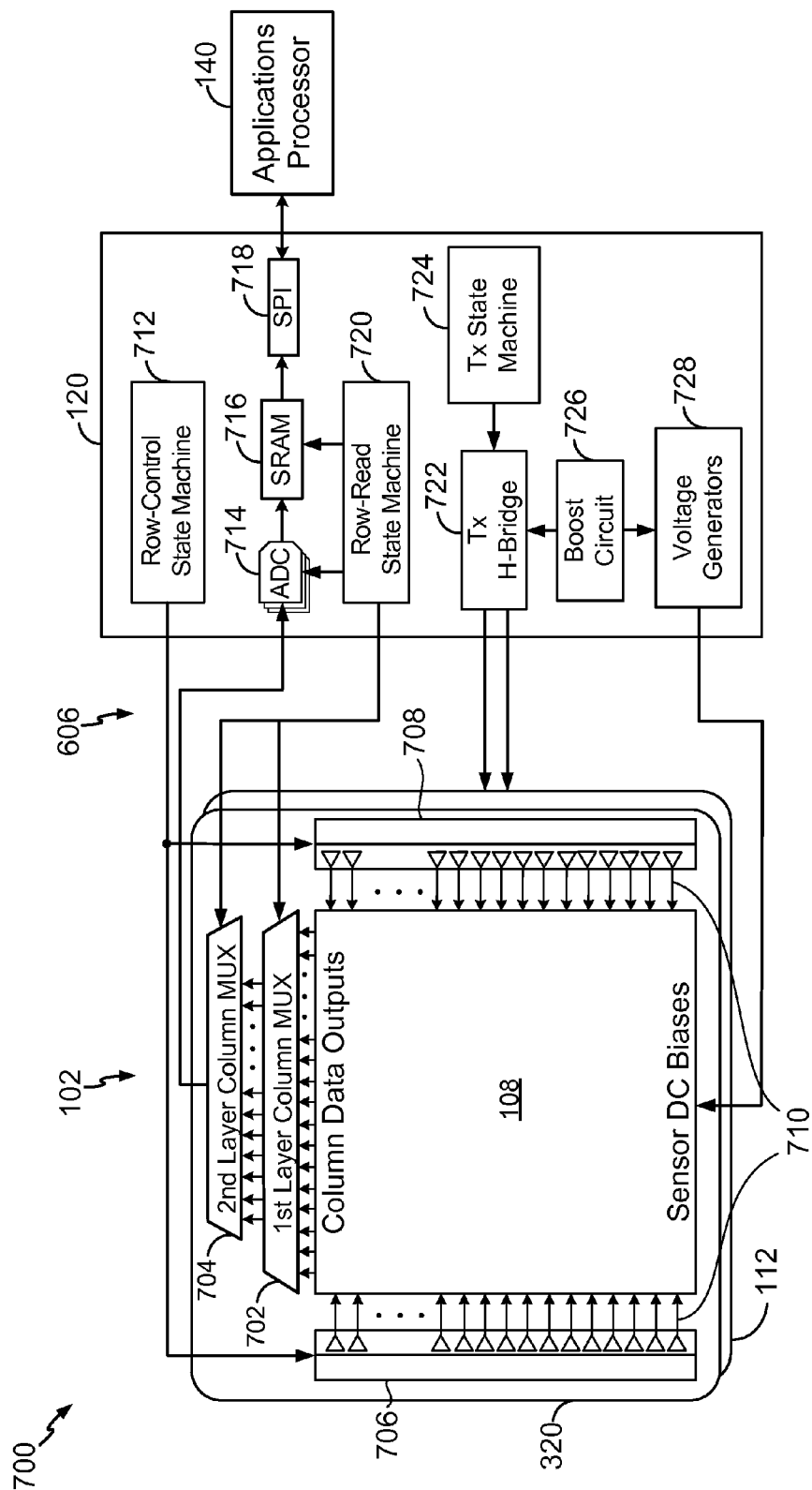
FIG. 7 is a diagram of a system that includes a sensor array, such as the sensor array of FIG. 1.

Referring to FIG. 7, a particular illustrative embodiment of a system is depicted and generally designated 700. Certain components and operations of the system 700 may be as described with reference to FIG. 1. For example, the system 700 may include the sensor array 102, the controller 120, and the applications processor 140. The sensor array 102 may include the receiver bias electrode 104, the piezoelectric receiver layer 106, an array of piezoelectric sensor elements 108, and the ultrasonic transmitter 112. The sensor array 102 may include the TFT substrate 320 of FIG. 3. The controller 120 and the sensor array 102 may be coupled via the flex circuit 606 of FIG. 6A.

In the example of FIG. 7, the sensor array 102 may include a first layer column multiplexer (MUX) 702, a second layer column MUX 704, a first row state machine 706 on a first side of an array of piezoelectric sensor elements 108, a second row state machine 708 on a second side of the array of piezoelectric sensor elements 108, and associated gate drivers 710. Although the row state machines 706, 708 are shown on the left and right sides of the piezoelectric sensor elements 108 with the gate drivers 710 positioned between the row state machines 706, 708 and the array, other configurations may be used. For example, the gate drivers 710 may be positioned on a single side of the piezoelectric sensor elements 108 (e.g., left or right side in FIG. 7). In another example, more than one row state machine 708 and associated gate drivers 710 may be located on a single side of the piezoelectric sensor elements 108 to enable driving of one or more rows of piezoelectric sensor elements 108 in parallel or using interleaved row-selection methods. Although the example of FIG. 7 shows rows in one direction (top to bottom) and columns in another direction (left to right), it is understood that rows and columns may be interchanged without loss of generality and that the piezoelectric sensor elements 108 may be arranged other than in a row-column arrangement, such as a circular arrangement or as groups of one or more pixels that may serve, for example, as sensor arrays for ultrasonic buttons, touchpads, biometric sensors such as fingerprint sensors, or integrated with a visual display of a mobile device.

The controller 120 may include a row-control state machine 712, one or more analog-to-digital converter (ADCs) such as a representative ADC 714, and a memory device 716 such as a static random access memory (SRAM) device. The controller 120 may further include a communications interface, such as a serial peripheral interface (SPI) 718, and a row-read state machine 720. Further, in the example of FIG. 7, the controller 120 may include a transmitter H-bridge circuit 722, a transmitter state machine 724, a boost circuit 726, and a set of voltage generators 728 for setting sensor DC biases.

The row-control state machine 712 may provide a first plurality of enable signals to the row state machines 706, 708, and the row-read state machine 720 may provide a second plurality of enable signals to the MUXs 702, 704 (e.g., to access the data samples 110 of FIG. 1 from one or more piezoelectric sensor elements 108 in the sensor array 102). In this example, the row state machines 706, 708 may be configured to receive the first plurality of enable signals from the row-control state machine 712, and the MUXs 702, 704 may be configured to provide the data samples 110 to the controller 120 based on the second plurality of enable signals received from the row-read state machine 720.

The controller 120 may be configured to select between individual piezoelectric sensor elements 108 of the sensor array 102. For example, the row-control state machine 712 and the row-read state machine 720 may be configured to select between individual piezoelectric sensor elements 108 of the sensor array 102. In this example, each of the piezoelectric sensor elements 108 is individually addressable by the controller 120, and the gate drivers 710 may be configured to access the piezoelectric sensor elements 108 responsive to the controller 120 (e.g., responsive to the row-control state machine 712 and the row-read state machine 720).

The applications processor 140 may be coupled to the controller 120 via the flex circuit 606, an interface, a communications interface, a bus, one or more other structures, or a combination thereof. In the example of FIG. 7, the applications processor 140 is coupled to the controller 120 via the SPI 718, which may correspond to the processor interface 132 of FIG. 1.

In operation, the controller 120 may operate the sensor array 102 via the flex circuit 606. For example, the controller 120 may utilize the row-control state machine 712 to operate the first row state machine 706 and/or the second row state machine 708 to select one or more of the piezoelectric sensor elements 108 (or rows or columns of piezoelectric sensor elements 108). Further, the voltage generators 728 may generate bias voltages to the receiver bias electrode (e.g., Rx Bias, also referred to as RBIAS), the diode bias (e.g., DBIAS), and others (e.g. AP) via the flex circuit 606. The transmitter H-bridge circuit 722 may apply voltages to the ultrasonic transmitter 112. In response to the transmitter control signal from the transmitter H-bridge circuit 722, the ultrasonic transmitter may generate an ultrasonic wave, such as the ultrasonic wave 150 of FIG. 1. The ultrasonic wave may propagate through components of the system 700 to an object, such as a stylus or a finger of a user. The ultrasonic wave may be reflected by the object and a surface of the sensor array 102, and may be received at the TFT substrate 320. The reflected ultrasonic wave may induce charges and voltages in the piezoelectric receiver layer 106 that are sensed by the piezoelectric sensor elements 108 on the TFT substrate 320 to generate data (e.g., the data samples 110 of FIG. 1) that may be read out from the sensor array 102.

The controller 120 may use the row-read state machine 720 to operate the MUXs 702, 704 and to select data outputs (e.g., columns of data) from the piezoelectric sensor elements 108 so that values from the piezoelectric sensor elements 108 may be read based on a reflected ultrasonic wave. Data read by the controller 120 from the MUXs 702, 704 may be provided to one or more of the ADCs 714 and loaded into the memory device 716. The data may be provided to or accessed by the applications processor 140 via the SPI 718. In a particular embodiment, the MUXs 702, 704 may be configured as a two-level group. Alternatively, the MUXs 702, 704 may be configured in a single level, in two or more levels, or ganged into parallel groups. In some implementations, the data from piezoelectric sensor elements 108 may be acquired with no MUXs 702, 704.

In an illustrative implementation, the voltage generators 728 are configured to generate the multi-level receiver bias voltages used to bias the receiver bias electrode 104 of FIG. 1 (omitted from FIG. 7 for clarity). For example, the voltage generators 728 may be configured to transition the receiver bias voltage from the hold value 204 to the block value 202, from the block value 202 to the sample value 206, and from the sample value 206 to the hold value 204, as described with reference to FIG. 2A.

Because the sensor array 102 is operated by the controller 120, processing resources of the applications processor 140 may be freed or otherwise made available for running other applications, such as the application 146 of FIG. 1. For example, because the controller 120 operates the piezoelectric sensor elements 108 and the ultrasonic transmitter 112, processing resources at the applications processor 140 are free to perform other processing tasks. Accordingly, performance at the applications processor 140 may be improved as compared to devices in which a processor directly controls a sensor array. In some implementations, the applications processor 140 may perform some or all of the functions described with respect to controller 120.

Figure 8:
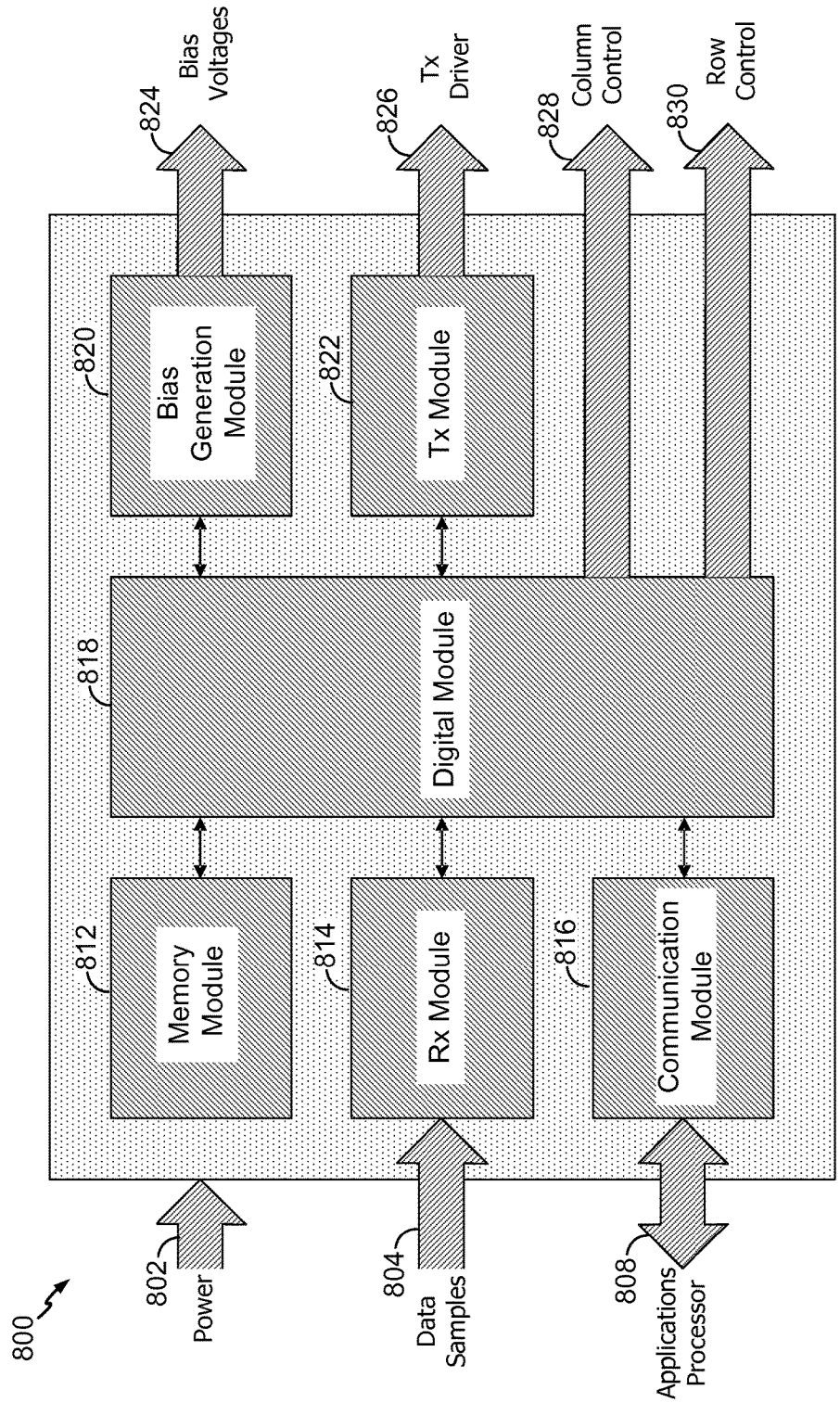
FIG. 8 is a diagram of an integrated circuit that may be included in the system of FIG. 1.

Referring to FIG. 8, a particular illustrative embodiment of an integrated circuit is depicted and generally designated 800. The integrated circuit 800 may correspond to the controller 120 of FIG. 1.

The integrated circuit 800 may include a memory module 812, a receiver module 814, a communication module 816, a digital module 818, a bias generation module 820, and a transmitter module 822. Further, the integrated circuit 800 may include multiple interfaces for communicating with other circuits and/or devices. For example, in the particular example of FIG. 8, the integrated circuit 800 includes a power interface 802, a data interface 804 (e.g., one or more input terminals of the controller 120, such as the terminal 126 of FIG. 1), an applications processor interface 808 (e.g., the processor interface 132 of FIG. 1), a bias voltage interface 824, a transmitter driver interface 826 (e.g., one or more output terminals of the controller 120, such as the terminal 128 of FIG. 1), a column-control interface 828, and a row-control interface 830.

In operation, the integrated circuit 800 may utilize the one or more interfaces to send and receive signals and/or information. For example, the bias generation module 820 may generate one or more bias voltages (e.g., the receiver bias voltages described with reference to FIG. 2A) that may be applied to an ultrasonic sensor array via the bias voltage interface 824. As another example, the transmitter module 822 may generate and apply one or more signals that may be applied to an ultrasonic transmitter via a transmitter driver circuit within the transmitter module 822 and the transmitter driver interface 826. As another example, the digital module 818 may generate signals that are applied to the sensor array via the column-control interface 828 and/or the row-control interface 830. The row-control interface 830 may connect to and control gate drivers on the TFT substrate, such as the drivers associated with the row state machines 706, 708 of FIG. 7.

Further, the multiple interfaces of the integrated circuit 800 may be utilized to receive power at the integrated circuit 800. In the example of FIG. 8, the integrated circuit 800 may utilize the power interface 802 to receive power from one or more voltage sources. The integrated circuit 800 may utilize the data interface 804 to receive data, such as pixel data or data samples from a sensor array, which may correspond to the sensor array 102 of FIG. 1. The integrated circuit 800 may control selection of rows and/or columns of data from the sensor array using the column-control interface 828 and the row-control interface 830. Further, the integrated circuit 800 may utilize the applications processor interface 808 to send and/or to receive data from a processor, such as the applications processor 140 of FIG. 1.

Because the integrated circuit 800 incorporates one or more functionalities and/or structures that may be implemented in discrete circuits in other devices, manufacturing and/or design of the integrated circuit 800 may be simplified as compared to discrete devices. For example, a single integrated circuit may be mounted on a PCB or on a flex circuit instead of mounting multiple discrete circuits upon the PCB or flex circuit. In some implementations, the integrated circuit 800 may be combined with one or more external components such as capacitors, inductors, resistors, transistors or other ICs to provide the desired functionality.

Figure 10:
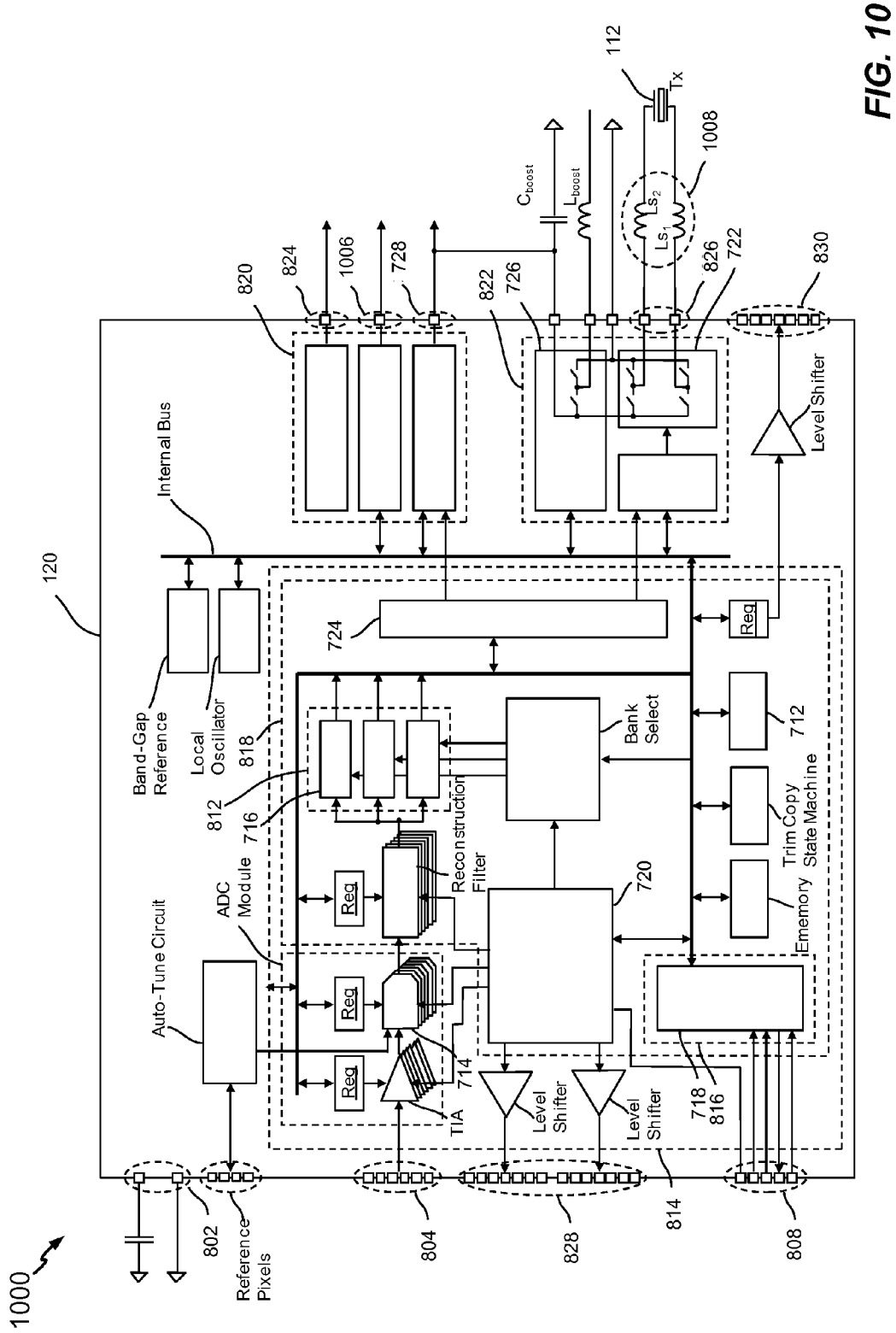
FIG. 10 is a diagram of a particular illustrative embodiment of a system that may correspond to the system of FIG. 1.

For example, one or two series inductors may be connected to the transmitter driver interface 826, as shown in FIG. 10.

Figure 9:
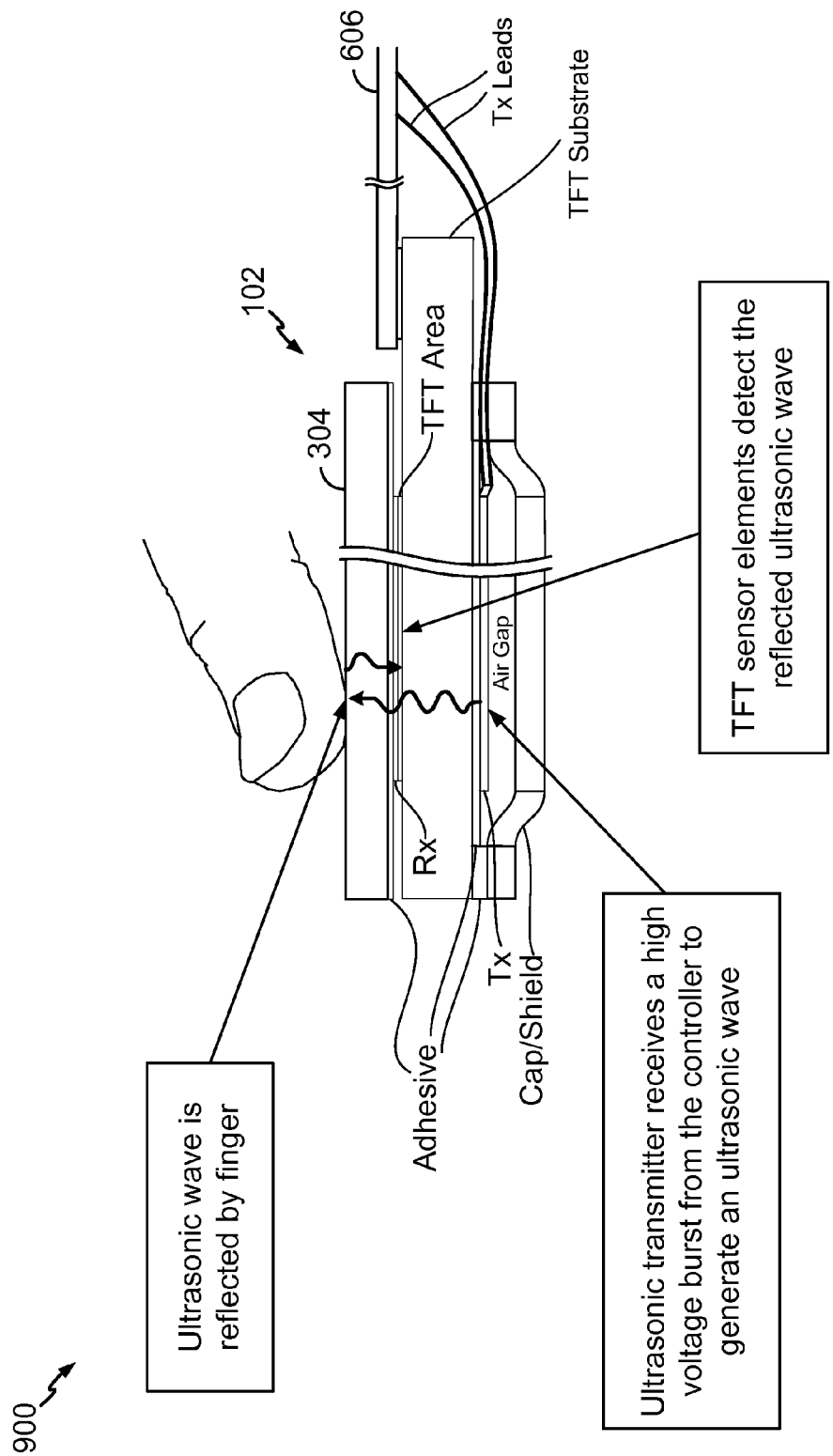
FIG. 9 is a diagram of a system that includes a sensor array, such as the sensor array of FIG. 1.

Referring to FIG. 9, an example operation of a system 900 is depicted. Certain components and/or operations of the system 900 may be as described with reference to FIG. 1. For example, the system 900 may include the sensor array 102 of FIG. 1. As another example, the system 900 may include the flex circuit 606 of FIG. 6A. In a particular illustrative embodiment, the flex circuit 606 includes a flex cable coupling the sensor array 102 to the controller 120 (not shown in FIG. 9). The system 900 may include the platen or cover glass 304 of FIG. 3. According to at least one alternate embodiment, a cover glass portion may be omitted from the system 900.

The example of FIG. 9 illustrates certain components and materials. It should be appreciated the particular example of FIG. 9 is illustrative and that other configurations are within the scope of the disclosure. For example, the particular dimensions of components of the system 900 will depend on the particular application. In a particular embodiment, the row-adhesives illustrated in FIG. 9 each have a thickness within a range of approximately 2-100 micrometers (μm). The receiver portion (Rx) may include a piezoelectric receiver layer 106 and may have a thickness within a range of approximately 5-50 μm. The transmitter portion (Tx) may include a piezoelectric transmitter layer 312 and may have a thickness of approximately 5-50 μm. The cap/shield portion may have a thickness of approximately 100-1000 μm. The platen or cover glass 304 may have a thickness within a range of approximately 50-1000 μm. In some implementations, a thin coating such as a diamond-like coating (DLC), parylene, or an acrylic layer having a thickness between about 1 and 50 μm may serve as a platen. The flex circuit 606 may have dimensions of approximately 10 mm, 30 mm, and 0.1 mm. Alternatively, components of the system 900 may have other dimensions.

Operation of the system 900 may include sending a high voltage burst from an ASIC to an ultrasonic transmitter to cause the ultrasonic transmitter to emit an ultrasonic wave. The ASIC may correspond to the controller 120, the ultrasonic transmitter may correspond to the ultrasonic transmitter 112, and the ultrasonic pulse may correspond to one or more ultrasonic waves 150. To illustrate, the high voltage burst may be generated at the transmitter H-bridge circuit 722. The controller 120 may transmit the high voltage burst to the transmitter electrodes 310, 314 of the ultrasonic transmitter 112 via the flex circuit 606 and/or other transmitter leads. The high voltage burst may cause the ultrasonic transmitter 112 to emit the ultrasonic wave 150. In an illustrative implementation, the high voltage burst may be generated in conjunction with a resonant circuit, as described further with reference to FIG. 10.

The ultrasonic pulse may be reflected by an object, such as a finger of a user. The reflected ultrasonic pulse may be detected at the sensor array 102 by the piezoelectric receiver layer 106 and/or by the piezoelectric sensor elements 108. The reflected ultrasonic pulse may correspond to the reflected ultrasonic wave 152 of FIG. 1.

The sensor array 102 may detect the reflected ultrasonic pulse. In a particular embodiment, the piezoelectric sensor elements 108 include TFT sensor elements that may change value (e.g., store a voltage) responsive to the reflected ultrasonic pulse and further responsive to a voltage generated across the piezoelectric receiver layer 106 (e.g., between the receiver bias electrode 104 and the pixel input electrodes 308 of FIG. 3). Operation of the system 900 may further include digitizing signals generated by the TFT sensor elements. For example, the data samples 110 may be digitized by an ADC of the core logic 130 of FIG. 1. The ADC may correspond to the ADC 714 of FIG. 7.

The example of FIG. 9 illustrates that TFT sensor elements may generate voltages in response to a reflected ultrasonic pulse. The voltages (e.g., data samples 110) may be transmitted to the controller 120 of FIG. 1, such as via the flex circuit 606. Further, the ADC 714 of FIG. 7 may receive the voltage and digitize the voltage to generate digital data usable by a processor, such as the applications processor 140 of FIG. 1.

Referring to FIG. 10, a particular illustrative embodiment of a system is depicted and generally designated 1000. Certain components and operations of the system 1000 of FIG. 10 may be as described with reference to FIGS. 1, 7 and 8. For example, the system 1000 may include the controller 120 of FIG. 1. The system 1000 may further include the ultrasonic transmitter 112 of FIG. 1, which may be integrated within the sensor array 102 (omitted from FIG. 10 for clarity). The system 1000 may further include the row-control state machine 712, the ADC 714, the memory device 716, the SPI 718, the row-read state machine 720, the transmitter H-bridge circuit 722, the transmitter state machine 724, the boost circuit 726, and the voltage generators 728 of FIG. 7.

As additional examples, the system 1000 may include the memory module 812, the receiver module 814, the communication module 816, the digital module 818, the bias voltage generation module 820, and the transmitter module 822 of FIG. 8. In the example of FIG. 10, the system 1000 further includes the power interface 802, the data interface 804, the applications processor interface 808, the bias voltage interface 824, the transmitter driver interface 826, and the row-control interface 830 of FIG. 8.

The system 1000 may further include a receiver bias voltage interface 1006. The receiver bias voltage interface 1006 may be configured to provide a receiver bias voltage (e.g., the receiver bias voltage described with reference to FIG. 2A) to the receiver bias electrode 104 of FIG. 1.

The system 1000 may further include a resonant circuit 1008 that is coupled between the controller 120 and the ultrasonic transmitter 112. The resonant circuit 1008 may include a resonant device, such as a resonant inductor-capacitor (LC) circuit. In the particular example of FIG. 10, the resonant circuit 1008 includes inductive elements, such as inductors Ls1, Ls2. The inductors Ls1, Ls2 may include discrete inductive devices or inductive traces on the flex circuit 606 of FIG. 6A, as illustrative examples. In other implementations, the resonant circuit 1008 may include different components than the example of FIG. 10. FIG. 10 further illustrates other boost components that may be coupled to (or included in) the controller 120, such as a boost capacitor (Cboost) and a boost inductor (Lboost). Those of skill in the art will recognize that a variety of resonant circuits can be implemented depending on the particular application.

In operation, the transmitter module 822 may generate an output signal, such as a transmitter control signal. The output signal may be provided to the resonant circuit 1008 via the transmitter driver interface 826. The resonant circuit 1008 may generate a burst signal based on the output signal, and the ultrasonic transmitter 112 may generate the ultrasonic wave 150 of FIG. 1 based on the burst signal.

To further illustrate, the transmitter state machine 724 may cause the transmitter H-bridge circuit 722 to generate the output signal. In an illustrative implementation, the transmitter H-bridge circuit 722 is responsive to a boost signal from the boost circuit 726. For example, the transmitter H-bridge circuit 722 may receive a 30-volt boost signal from the boost circuit 726. It should be appreciated that the example of FIG. 10 is illustrative and that the particular boost signal provided to the transmitter H-bridge circuit 722 (if any) will typically depend on the particular application. In either case, the transmitter H-bridge circuit 722 may generate the output signal, such as a square-wave signal having a particular frequency (or frequency range). For example, the controller 120 may toggle switches of the transmitter H-bridge circuit 722 to generate the square wave signal, such as by alternating activation of switches coupled to a power supply node and switches coupled to a ground node.

The output signal may be provided to the resonant circuit 1008 via the transmitter driver interface 826. The resonant circuit 1008 may be configured to resonate at a particular frequency or frequency range based on the output signal and to provide a burst signal to the ultrasonic transmitter 112. The burst signal may have a voltage of between about 30 and 800 volts. For example, in a particular illustrative embodiment, the resonant circuit 1008 is configured to cause a resonant voltage gain that amplifies signals of particular frequencies from approximately 30 volts to a high voltage burst signal based on the output signal provided by the transmitter H-bridge circuit 722. In a particular embodiment, the resonant circuit 1008 is configured to amplify signals of particular frequencies from approximately 30 volts peak-to-peak to approximately 200 volts peak-to-peak.

The burst signal may cause the ultrasonic transmitter 112 to generate the ultrasonic wave 150. The transmitter state machine 724 may control frequency and timing of the ultrasonic wave 150, such as by sweeping or changing a frequency of operation of the ultrasonic transmitter 112 (e.g., based on a control signal from the applications processor 140). The controller 120 may be configured to control a magnitude, frequency, and/or number of voltage or current pulses or cycles applied to the ultrasonic transmitter 112.

The controller 120 may be configured to access data that is generated based on the ultrasonic wave 150, such as by accessing the data samples 110 of FIG. 1. Further, the row-control state machine 712 may control operation of the MUXs 702, 704 to enable access of data from the sensor array 102. The data samples 110 may be received via the data interface 804. The ADC 714 may convert the data samples 110 from an analog representation to a digital representation to generate digital data. The digital data may be provided to the memory device 716. The memory device 716 may provide the digital data to a processor, such as the applications processor 140 of FIG. 1, via the applications processor interface 808.

The controller 120 may be configured to access data on a row-by-row basis. In a particular illustrative embodiment, a row of data (corresponding to a row of pixels of the sensor array 102) is provided to the applications processor 140 via the applications processor interface 808 while another row of data is loaded into the memory device 716. In this example, rows of data from the sensor array 102 may be provided to the applications processor 140 on a "per-row" basis (or "one row at a time"). In another particular embodiment, a subset of rows of the sensor array 102 may be selected for access by the controller 120. For example, data samples from every other row (or from every third row or fourth row, etc.) may be accessed by the controller 120, which may increase the frame rate for capturing an ultrasonic image. Alternatively or in addition, individual piezoelectric sensor elements of the piezoelectric receiver layer 106 may be selected by the controller 120. The controller 120 may access one or more rows in a forward direction and may then read one or more rows in a reverse or "backward" direction. Piezoelectric sensor elements near a perimeter of the TFT substrate 320 (or at other locations on the TFT substrate 320) may be read more times than other piezoelectric sensor elements of the TFT substrate, which may increase signal-to-noise ratio or signal quality. The speed and mode of scanning of the sensor array 102 may be determined by the controller 120 or by the applications processor 140.

The system 1000 of FIG. 10 may enable improved efficiency of sensing operations. For example, the system 1000 may enable efficient communications between the controller 120 and a processor by providing rows of data from the memory device 716 to the processor on a "per-row" basis. Accordingly, a first row of data may be provided to the processor while a second row of data is sensed from the sensor array 102 and/or loaded into the memory device 716.

Figure 11:
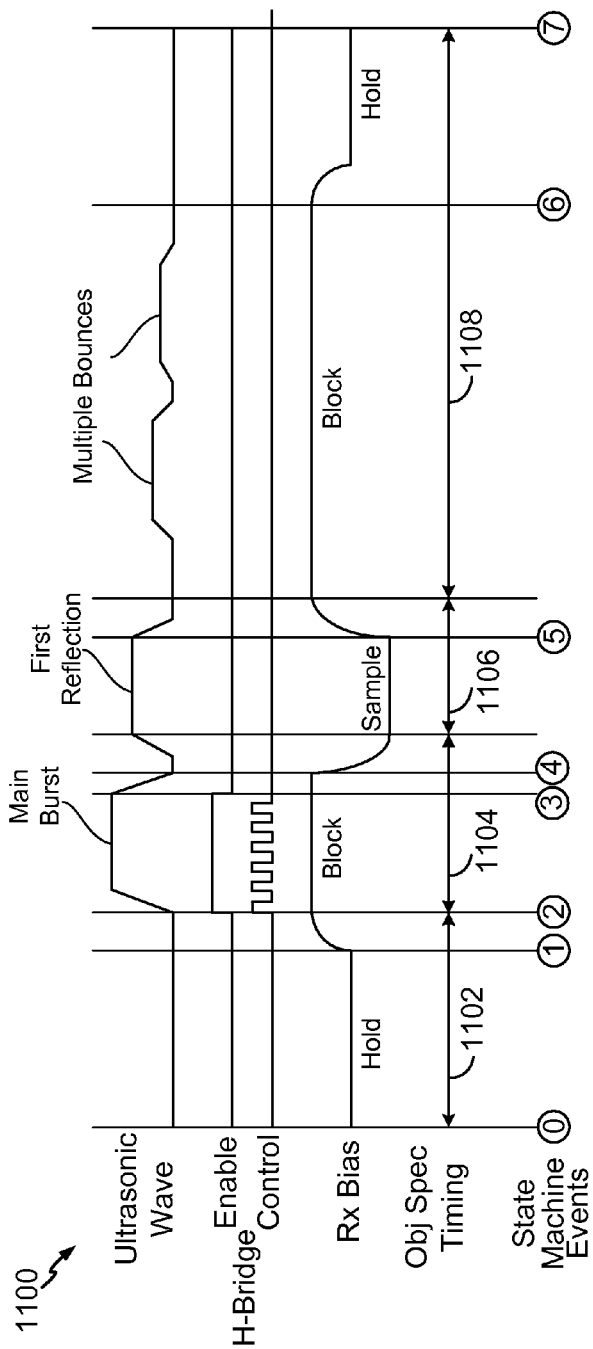
FIG. 11 is a timing diagram illustrating example operations that may be performed at the system of FIG. 1.

Referring to FIG. 11, a timing diagram of example operations is depicted and generally designated 1100. In a particular embodiment, the timing diagram 1100 illustrates operations of the controller 120 of FIG. 1.

FIG. 11 illustrates particular example durations of a first time interval 1102, a second time interval 1104, a third time interval 1106, and a fourth time interval 1108. In a particular embodiment, the time intervals 1102, 1104 and 1106 correspond to the time intervals 212, 214 and 216 of FIG. 2A, respectively. Time interval 1108 represents a variation of the time interval 218 of FIG. 2A. The timing diagram 1100 further illustrates events 0, 1, 2, 3, 4, 5, 6 and 7 that occur during the time intervals 1102, 1104, 1106 and 1108.

It should be appreciated that the time intervals 1102, 1104, 1106 and 1108 are illustrative and not necessarily drawn to scale. For example, the third time interval 1106 may be of a longer duration or appreciably shorter than the second time interval 1104, depending on the particular application. In a particular embodiment, the time intervals 1104, 1108 comprise approximately 450 nanoseconds (ns) and 360 ns, respectively. It will be appreciated that durations of one or more of the time intervals 1102, 1104, 1106 and 1108 may depend on a size (e.g., "acoustic stack thickness") of the piezoelectric receiver layer 106, the thickness of the TFT substrate 320, the thickness of a platen or cover glass 304, another parameter such as the density or speed of sound in each material in the sensor stack, or a combination thereof.

Operations illustrated by the timing diagram 1100 may include initiating operation of the controller 120 of FIG. 1 during the first time interval 1102. For example, a transmitter state machine, such as the transmitter state machine 724 of FIG. 7, may initiate operation. Further, an H-bridge device, such as the transmitter H-bridge circuit 722 of FIG. 7, may enter a standby mode. Certain amplifiers that may be included in the controller 120, such as class-AB amplifiers, may enter an operating state (e.g., by transitioning from a low-power standby mode). During the first time interval 1102, a receiver bias (RBIAS) voltage may have a hold value. The RBIAS voltage may correspond to the receiver bias voltage described with reference to FIG. 2A, and the hold value may correspond to the hold value 204. The RBIAS voltage may be applied at the sensor array 102, such as at the receiver bias electrode 104.

The operations of FIG. 11 may further include transitioning the RBIAS voltage to a block value during the first time interval 1102. The block value may correspond to the block value 202 of FIG. 2A. In a particular embodiment, the second interval 1104 has a duration that is within a range of approximately 1 to 3 microseconds (μs). The duration for which the RBIAS voltage has the block value may depend on a component thickness, such as a thickness of the TFT substrate 320, a duration (e.g., a number of burst cycles) of an H-bridge enable signal or a transmitter control frequency, a frequency of the H-bridge enable signal or the transmitter control frequency, or a combination thereof.

The operations may further include operating (e.g., activating and/or deactivating) the H-bridge device during the second time interval 1104, such as by enabling and controlling the H-bridge device to cause the piezoelectric transmitter layer 312 of the ultrasonic transmitter 112 to generate an ultrasonic wave. FIG. 11 depicts that the H-bridge enable signal is asserted during a main burst of an ultrasonic wave (e.g., the ultrasonic wave 150 of FIG. 1). For example, the H-bridge enable signal may cause the transmitter H-bridge circuit 722 to transition from a "standby" mode of operation to an "on" mode of operation. In a particular embodiment, the main burst of the ultrasonic wave has a duration that is within a range of approximately 20 nanoseconds (ns) to 1.1 μs as compared to a transmit duration that is between about 0.2 and 0.5 μs. The duration of the main burst may depend on a number of burst cycles of the ultrasonic transmitter 112, a frequency of the ultrasonic transmitter 112, another parameter, or a combination thereof.

FIG. 11 further depicts that an H-bridge control signal changes values (e.g., is toggled) one or more times during the main burst that occurs during the second time interval 1104. The duration of the main burst illustrated in FIG. 11 may depend on the number of cycles and frequency of the H-bridge control signal. In a particular embodiment, the H-bridge control signal is applied at the transmitter H-bridge circuit 722 to cause the transmitter H-bridge circuit 722 to generate the output signal (e.g., a square wave) at the transmitter driver interface 826 of FIG. 8. The output signal may be applied at the resonant circuit 1008. The resonant circuit 1008 may be configured to resonate at a particular frequency or frequency range of the output signal and to provide a burst signal to the ultrasonic transmitter 112 based on the output signal. The burst signal may cause the ultrasonic transmitter 112 to generate an ultrasonic wave, such as the "main burst" of the ultrasonic wave illustrated in the example of FIG. 11. In a particular embodiment, the RBIAS voltage has a sample value (e.g., the sample value 206 of FIG. 2A) for a duration that is within a range of approximately 0.25 to 1.5 microseconds (μs). The particular duration for which the RBIAS voltage has the sample value may depend on a duration (e.g., a number of burst cycles) of the H-bridge enable signal, a frequency of the H-bridge enable signal, another parameter, or a combination thereof.

After the ultrasonic wave is transmitted, the RBIAS voltage may be transitioned from the block value to the sample value during the second time interval 1104. In the example of FIG. 11, the RBIAS voltage transitions (e.g., exponentially decays) from the block value to the sample value over a particular duration of the second time interval 1104. The particular duration may correspond to a thickness of a display or cover glass portion (e.g., the platen or cover glass 304). For example, because the main burst may need to propagate through the platen or cover glass portion before reaching an object, the RBIAS voltage may be maintained at the block value until the main burst has propagated past a receiver device, such as the piezoelectric receiver layer 106. The RBIAS voltage may be transitioned to the sample value before a first reflection of the main burst is received at the receiver device.

During the third time interval 1106, the piezoelectric receiver layer 106 may generate a signal responsive to detecting the first reflection of the ultrasonic wave. The piezoelectric sensor elements 108 may store voltages responsive to the signal generated by the piezoelectric receiver layer 106. The operations of FIG. 11 may further include transitioning a value of the RBIAS voltage from the sample value to the block value during the third time interval 1106 and/or transitioning the RBIAS voltage from the block value to the hold value during the fourth time interval 1108. The operations of FIG. 11 may further include putting one or more devices to sleep or in a low-power mode, such as putting the H-bridge device to sleep and/or putting the amplifiers in a low-current mode of operation.

The example of FIG. 11 may facilitate effective sensing operations at a device. When the RBIAS voltage has the block value during the main burst of the ultrasonic wave, the piezoelectric sensor elements 108 do not detect voltages responsive to reception or transmission of the ultrasonic wave. Further, as illustrated in FIG. 11, the RBIAS voltage may have the block value while additional bounces of the reflected wave occur, thus reducing or preventing reception of bounces after reception of the first reflection of the ultrasonic wave. Accordingly, spurious signals may be reduced, which may improve performance (e.g., by reducing interference with other signals, by reducing inconsequential processing, etc.). In some implementations, a short sampling period achieved with a short third time value 1106 and a block value applied to RBIAS before and after the sample value allows time-gating or range-gating of the reflected ultrasonic wave 150.

Figure 12:
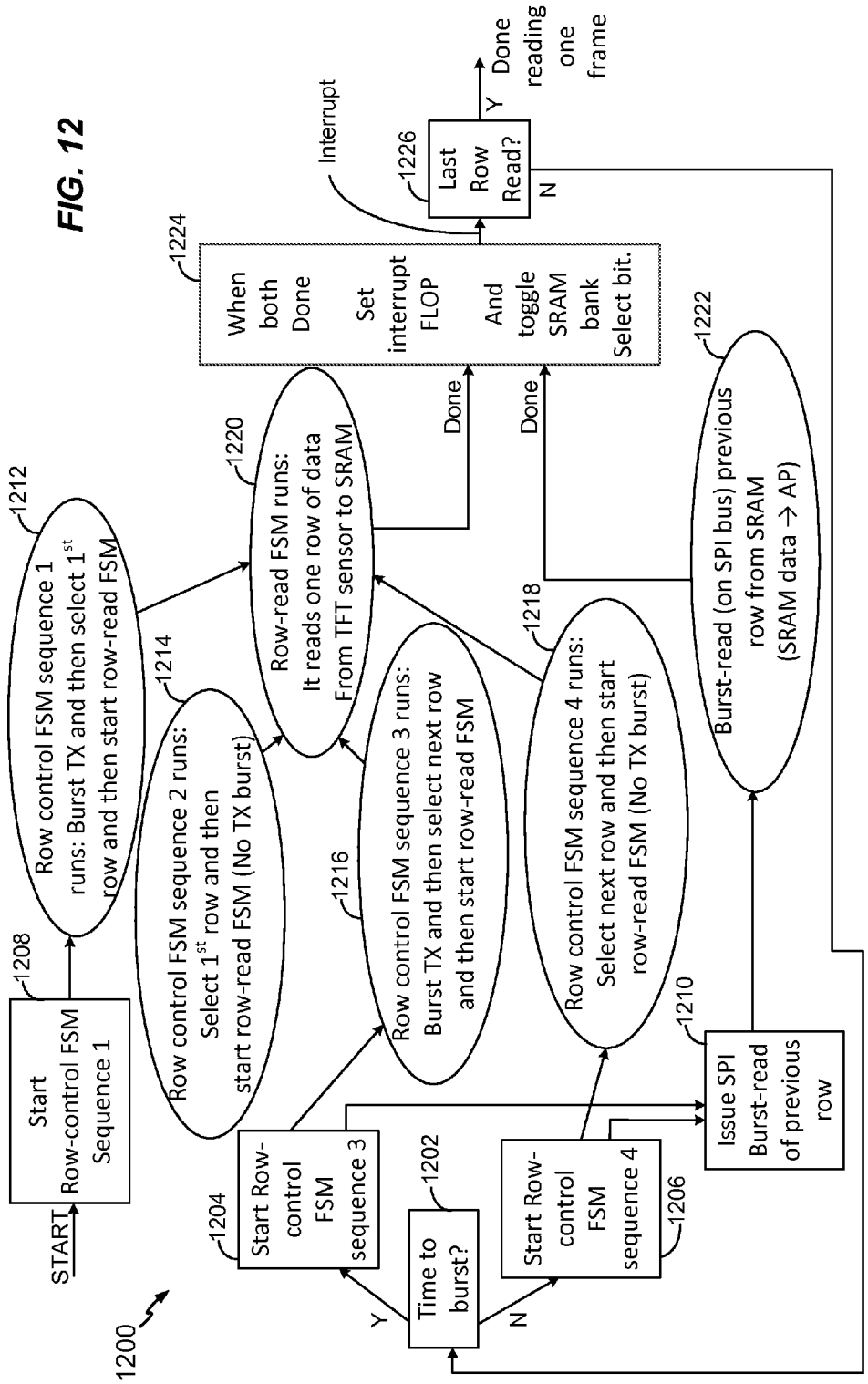
FIG. 12 is a diagram illustrating example operations that may be performed at the system of FIG. 1.

Referring to FIG. 12, example operations are depicted and generally designated 1200. In an illustrative implementation, the operations 1200 correspond to a process to read a frame of data at the sensor array 102 of FIG. 1. Certain operations of FIG. 12 may be performed by the sensor array 102 and/or by the controller 120, such as by the row-read state machine 720 of FIG. 7.

At 1208, the operations 1200 include initiating operation at the row-read state machine 720, generally referred to as a finite-state machine (FSM). At 1212, the operations 1200 include selecting a first row while a transmit burst is applied to the ultrasonic transmitter 112. A row of data may be read from the piezoelectric sensor elements 108, at 1220. The row of data may be stored at a memory device, such as the memory device 716. At 1224, an interrupt may be asserted (e.g., to indicate that rows of data are available to be read from the memory device by an applications processor, such as the applications processor 140). As a particular example, a bit stored at a flip-flop of the controller 120 may be set to indicate that data is available to be read from the memory device by the applications processor. The bit may be readable by the applications processor via an interface, such as via the SPI 718.

At 1226, a determination is made whether a last row of a frame of data has been read. If the last row of the frame of data has been read, then the operations 1200 may terminate. For example, reading of a second frame of data may be initiated upon determining that the last row has been read. If the last row has not been read, then row-control sequences may be initiated, at 1204 or at 1206, based on whether a burst event is determined to occur, at 1202. A row of data may be read, at 1210. Data may be provided from the memory device to the applications processor 140, at 1222. For example, data may be provided from row-control state machines at 1214, at 1216, and at 1218. The data may correspond to the data samples 110 of FIG. 1.

The operations 1200 of FIG. 12 illustrate that data samples (e.g., a first row of data) may be buffered in the memory device 716 and provided to the applications processor 140 while additional data samples (e.g., a second row of data) are read from a sensor array, such as the piezoelectric sensor elements 108 of the sensor array 102. The operations 1200 may enable improved efficiency of operations. For example, the operations 1200 may enable efficient communications between the controller 120 and the applications processor 140 by providing rows of data from the memory device 716 to the applications processor 140 on a "per-row" basis. Accordingly, a first row of data may be provided to the applications processor 140 while a second row of data is sensed from the sensor array 102 and/or loaded into the memory device 716, thus improving performance (e.g., by improving throughput).

The examples herein may facilitate detection and/or recognition of a user fingerprint. In a particular embodiment, an image of a user fingerprint may be obtained by acquiring a first or reference frame of data without generating an ultrasonic wave, followed by acquiring a second or image frame of data after generating an ultrasonic wave, then subtracting the reference frame from the image frame to obtain an ultrasonic image. One or more image frames may be acquired per reference frame. In another particular embodiment, the reference frame may be acquired after the acquisition of an image frame and subtracted accordingly. In another particular embodiment, data from one or more rows of the piezoelectric sensor elements 108 may be acquired with and without an accompanying ultrasonic wave to allow nearly immediate subtraction of the background or reference signal levels. The subtractions may be performed by either the applications processor 140 or by the controller 120, as illustrative examples.

Figure 13:
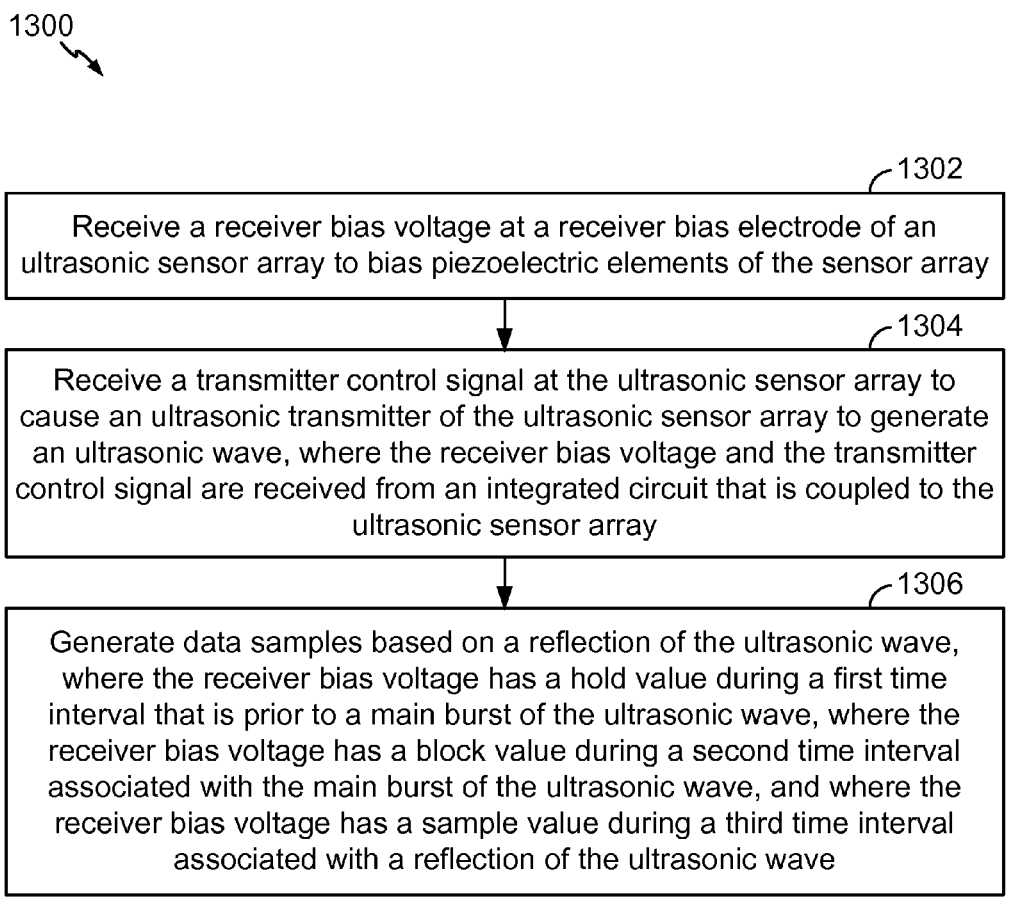
FIG. 13 is a diagram illustrating a particular illustrative embodiment of a method of operation of a sensor array, such as the sensor array of FIG. 1.

Referring to FIG. 13, a particular illustrative embodiment of a method of operating an ultrasonic sensor array is depicted and generally designated 1300. The method 1300 may be performed by the sensor array 102 of FIG. 1.

The method 1300 may include receiving a receiver bias voltage at a receiver bias electrode of the ultrasonic sensor array to bias piezoelectric sensor elements of the ultrasonic sensor array, at 1302. The receiver bias electrode may correspond to the receiver bias electrode 104, and the piezoelectric sensor elements may correspond to the piezoelectric sensor elements 108. The receiver bias voltage may be received from the controller 120.

The method 1300 may further include receiving a transmitter control signal at the ultrasonic sensor array to cause an ultrasonic transmitter of the ultrasonic sensor array to generate an ultrasonic wave, at 1304. The ultrasonic transmitter may correspond to the ultrasonic transmitter 112, and the ultrasonic wave may correspond to the ultrasonic wave 150. In a particular embodiment, the receiver bias voltage and the transmitter control signal are received from an integrated circuit that is coupled to the ultrasonic sensor array. The integrated circuit may correspond to the controller 120. The transmitter control signal may be received directly from the controller 120, such as from the transmitter H-bridge circuit 722 of FIG. 7. In another implementation, the transmitter control signal corresponds to a burst signal that is received from the resonant circuit 1008 of FIG. 10, and the ultrasonic wave 150 is generated based on the burst signal.

The method 1300 may further include generating data samples based on a reflection of the ultrasonic wave, at 1306. The ultrasonic wave may be reflected from a stylus or a finger of a user, as illustrative examples. The data samples may correspond to the data samples 110, and the reflection may correspond to the reflected ultrasonic wave 152. In a particular embodiment, the data samples 110 are generated by the piezoelectric sensor elements 108 based on the reflected ultrasonic wave 152.

In the example of FIG. 13, the receiver bias voltage has a hold value during a first time interval that is prior to a main burst of the ultrasonic wave. The hold value may correspond to the hold value 204, and the first time interval may correspond to the first time interval 212 and/or the first time interval 1102. The receiver bias voltage has a block value during a second time interval associated with the main burst of the ultrasonic wave. The block value may correspond to the block value 202, and the second time interval may correspond to the second time interval 214 and/or the second time interval 1104. The receiver bias voltage has a sample value during a third time interval associated with a reflection of the ultrasonic wave. The sample value may correspond to the sample value 206, and the third time interval may correspond to the third time interval 216 and/or the third time interval 1106. The receiver bias voltage may have the block value during a fourth time interval associated with a bounce of the reflection of the ultrasonic wave. The fourth time interval may correspond to the fourth time interval 1108.

In a particular embodiment, the receiver bias voltage is received from a first terminal of the controller 120, the data samples are accessed by the controller 120 via a second terminal of the controller 120, and the transmitter control signal is received from a third terminal of the controller 120. The first terminal may correspond to the terminal 124, the second terminal may correspond to the terminal 126, and the third terminal may correspond to the terminal 128.

The method 1300 of FIG. 13 illustrates simplified operation of an ultrasonic sensor array, such as the sensor array 102. For example, by transitioning a common bias voltage (the receiver bias voltage) between multiple values, generation of spurious signals and other noise can be reduced or avoided. Further, because a common bias voltage may be applied to each piezoelectric sensor element of a sensor array, a receiver bias electrode may have a monolithic (or "plate") configuration. For example, the receiver bias electrode may be formed in a single metal layer of a device using a simple metal deposition technique, as an illustrative example.

Figure 14:
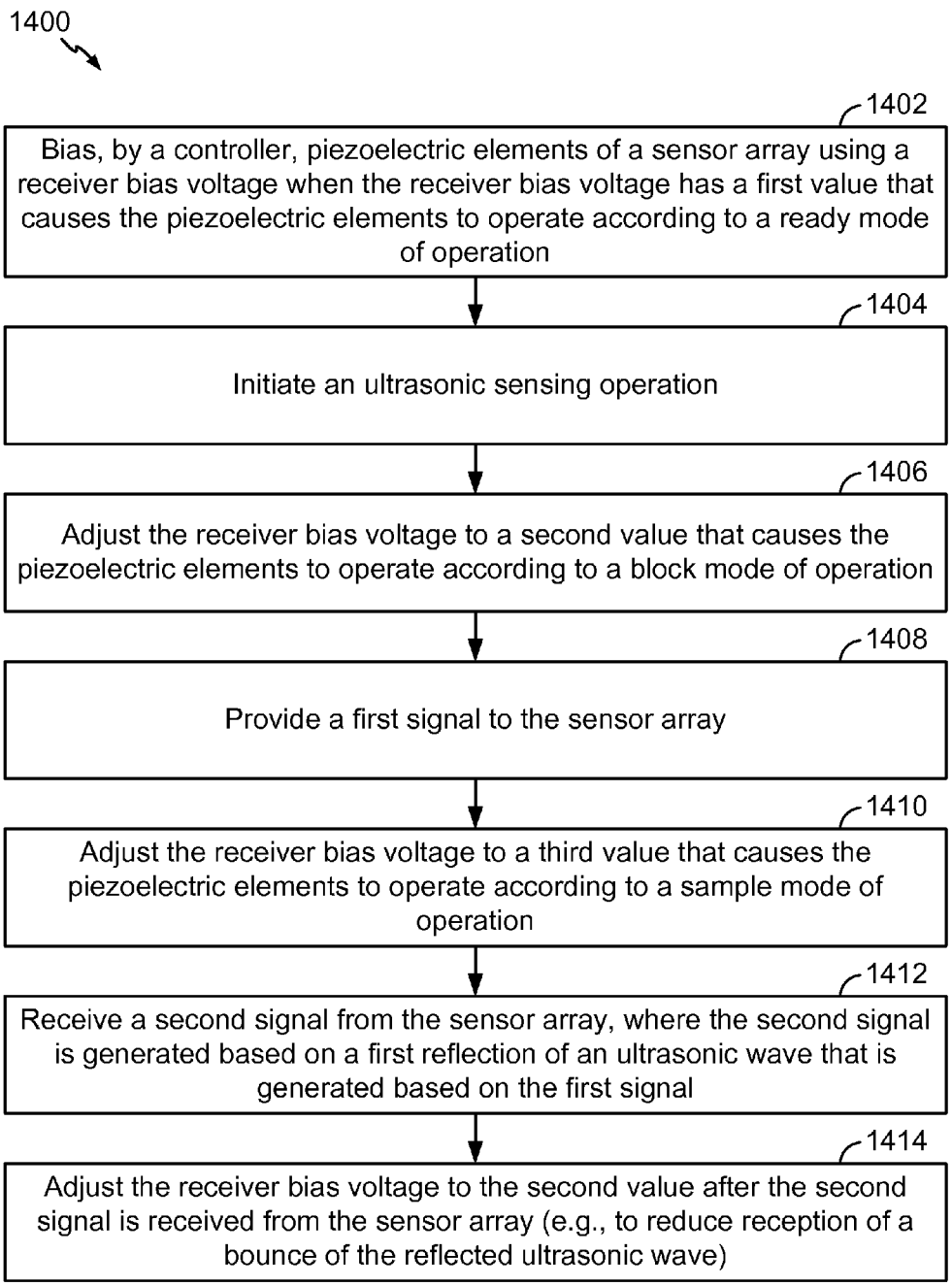
FIG. 14 is a diagram of a particular illustrative embodiment of a method of controlling a sensor array, such as the sensor array of FIG. 1.

Referring to FIG. 14, a particular illustrative embodiment of a method of controlling a sensor array is depicted and generally designated 1400. The sensor array may correspond to the sensor array 102, and the method 1400 may be performed by the controller 120.

The method 1400 may include biasing, by the controller, piezoelectric sensor elements of a sensor array, at 1402. The sensor array and the piezoelectric sensor elements may correspond to the sensor array 102 and the piezoelectric sensor elements 108 of FIG. 1, respectively. The piezoelectric sensor elements may be biased using a receiver bias voltage, such as the receiver bias voltage described with reference to the timing diagram 200 of FIG. 2A. The piezoelectric sensor elements may be biased using a first value of the receiver bias voltage that causes the piezoelectric sensor elements of the sensor array to operate according to a ready or hold mode of operation. The first value may correspond to the hold value 204 of FIG. 2A.

The method 1400 may further include initiating an ultrasonic sensing operation, at 1404. For example, the controller 120 may receive a command from the applications processor 140 indicating that the controller 120 is to initiate the ultrasonic sensing operation.

The method 1400 may further include adjusting the receiver bias voltage to a second value, at 1406. The second value may cause the piezoelectric sensor elements to operate according to a block mode of operation. The second value may correspond to the block value 202 of FIG. 2A.

The method 1400 may further include providing a first signal to the sensor array, at 1408. The first signal may correspond to a burst signal or a transmitter control signal generated using the resonant circuit 1008 of FIG. 10. The burst signal may be provided to the ultrasonic transmitter 112 to initiate generation of a main burst of the ultrasonic wave 150 by the ultrasonic transmitter 112.

The method 1400 may further include adjusting the receiver bias voltage to a third value, at 1410. The third value may cause the piezoelectric sensor elements to operate according to a sample mode of operation. The third value may correspond to the sample value 206 of FIG. 2A.

The method 1400 may further include receiving a second signal from the sensor array, at 1412. The second signal may be generated by the sensor array based on a first reflection of an ultrasonic wave, such as based on the reflected ultrasonic wave 152 of FIG. 1. The ultrasonic wave may be generated by the ultrasonic transmitter 112 based on the first signal.

The method 1400 may further include adjusting the receiver bias voltage to the second value after the second signal is received from the sensor array, at 1414. The receiver bias voltage may be adjusted to the second value such as a block value to reduce or prevent reception of one or more bounces of the reflection of the ultrasonic wave at the piezoelectric sensor elements.

Because the receiver bias voltage has a block value during the main burst of the ultrasonic wave, reception of the main burst of the ultrasonic wave by the piezoelectric sensor elements 108 may be reduced or inhibited. In addition, reception of the first reflection of the ultrasonic wave is enabled because the receiver bias voltage has the sample value during the first reflection of the ultrasonic wave. Further, as illustrated in FIG. 14, the receiver bias voltage may have the block value while one or more bounces of the reflection are generated, thus reducing or preventing reception of bounces after the first reflection of the ultrasonic wave.

Figure 15:
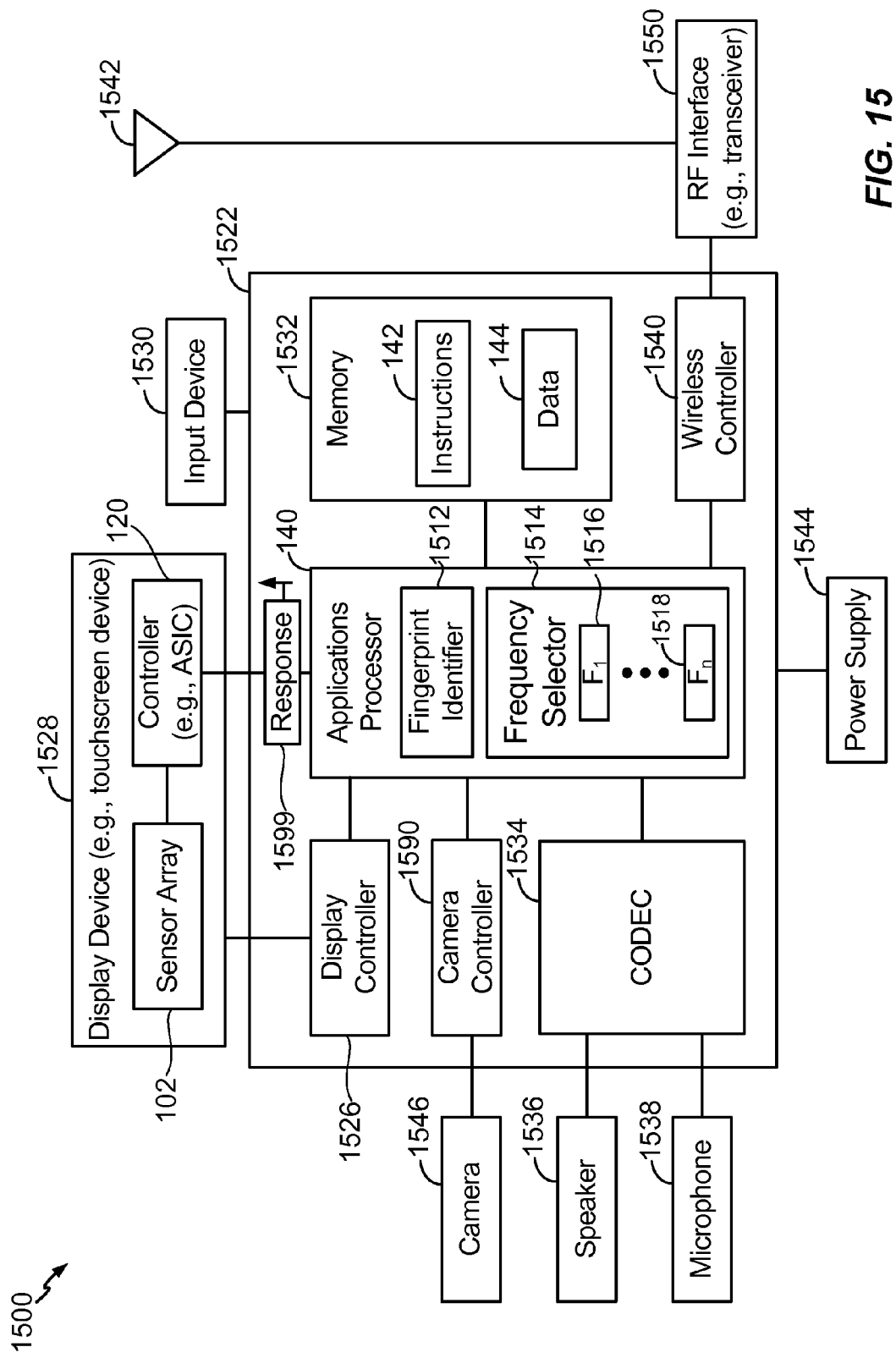
FIG. 15 is a diagram of a particular illustrative embodiment of a mobile device that includes a sensor array, such as the sensor array of FIG. 1.

Referring to FIG. 15, a block diagram of a particular illustrative embodiment of a mobile device is depicted and generally designated 1500. The mobile device 1500 may include a processor, such as the applications processor 140. In the example of FIG. 15, the applications processor 140 may include a fingerprint identifier 1512 and a frequency selector 1514. In a particular embodiment, the fingerprint identifier 1512 and the frequency selector 1514 correspond to the application 146 of FIG. 1.

The applications processor 140 may be coupled to a computer-readable medium, such as to a memory 1532 (e.g., a non-transitory computer-readable medium). The memory 1532 may store instructions executable by the applications processor 140 and may further store data usable by the applications processor 140, such as the instructions 142 and the data 144.

FIG. 15 also shows a display controller 1526 that is coupled to the applications processor 140 and to a display device 1528 (e.g., a touchscreen device). In the example of FIG. 15, the display device 1528 includes the sensor array 102 and the controller 120. Alternatively or in addition, a sensor array and/or a controller may be positioned at another location of the mobile device 1500. For example, the mobile device 1500 may include a dedicated fingerprint sensor that is external to the display device 1528. Thus, the display device 1528 may be configured both as a graphical display and as an ultrasonic sensor system to transmit an ultrasonic wave, to receive a reflection of the ultrasonic wave, and to provide information (e.g., on a row-by-row, column-by-column, or pixel-by-pixel basis) related to objects positioned near or on the display device 1528 based on the reflected ultrasonic wave. In other embodiments, the display device 1528 may include a capacitive touchscreen, with a portion of the touchscreen or a region near the touchscreen having an ultrasonic sensor array that may be used for touch, stylus or fingerprint detection.

A coder/decoder (CODEC) 1534 may also be coupled to the applications processor 140. One or more speakers 1536 and one or more microphones 1538 may be coupled to the CODEC 1534. The mobile device 1500 may include one or more cameras 1546 coupled to a camera controller 1590. The camera controller 1590 may be coupled to the applications processor 140. FIG. 15 also indicates that a wireless controller 1540 may be coupled to the applications processor 140. The wireless controller 1540 may be further coupled to an antenna 1542 via a radio frequency (RF) interface 1550.

In a particular embodiment, the applications processor 140, the memory 1532, the display controller 1526, the camera controller 1590, the CODEC 1534, the wireless controller 1540, and the RF interface 1550 are included in a system-in-package or system-on-chip device 1522. An input device 1530 and a power supply 1544 may be coupled to the system-on-chip device 1522. Moreover, in a particular embodiment, and as illustrated in FIG. 15, the display device 1528, the input device 1530, the camera 1546, the speaker 1536, the microphone 1538, the antenna 1542, and the power supply 1544 are external to the system-on-chip device 1522. However, each of the display device 1528, the input device 1530, the camera 1546, the speaker 1536, the microphone 1538, the antenna 1542, and the power supply 1544 can be coupled to a component of the system-on-chip device 1522, such as to an interface or to a controller.

In operation, the applications processor 140 may receive data samples from the controller 120. The data samples may correspond to measurements of a reflected ultrasonic wave of a particular frequency that is generated by the sensor array 102. The data samples may be provided from the controller 120 to the applications processor 140 on a "per-row", "per-column", or "per-frame" basis.

In response to receiving the data samples from the controller 120, the applications processor 140 may analyze a metric associated with data samples. In a particular embodiment, the applications processor 140 is configured to analyze a signal-to-noise ratio (SNR) associated with the data samples. If the SNR satisfies a threshold (e.g., has a value that is above a predetermined threshold SNR), then the applications processor 140 may send a response 1599 to the controller 120 that indicates that the controller 120 is to maintain operation of the sensor array 102 at the particular transmitter excitation frequency. Further, the applications processor 140 may utilize the fingerprint identifier 1512 to identify and/or recognize a fingerprint associated with the data samples (e.g., in order to authenticate a user of the mobile device 1500).

If the SNR does not satisfy the threshold (e.g., has a value that is less than a predetermined threshold SNR), then the applications processor 140 may utilize the frequency selector 1514 to determine another frequency at which the sensor array 102 is to be operated. For example, the applications processor 140 may select a first frequency 1516 or an nth frequency 1518 (where n indicates an integer greater than one). In this case, the response 1599 may instruct the controller 120 to update a frequency of operation of the sensor array 102 from the first frequency 1516 to the nth frequency 1518 (or vice versa) and to provide data samples based on the updated frequency of operation.

Based on the response 1599, the integrated circuit may operate the sensor array 102 according to the updated frequency (e.g., may cause the ultrasonic transmitter 112 to generate an ultrasonic wave at the selected frequency). In a particular embodiment, the applications processor 140 analyzes a transfer function characteristic of the sensor array 102. For example, the applications processor 140 may attempt to determine a frequency that corresponds to a "peak" region of a transfer function characteristic of the sensor array 102 (e.g., in order to increase the SNR associated with measured data samples). The transfer function may represent the magnitude of the signal from the TFT pixels over a range of transmitter driver frequencies. Depending in part on the thickness, area, and dielectric constants of the ultrasonic transmitter 112 and the piezoelectric receiver layer 106, a local peak may be obtained within a particular frequency range, such as a frequency range between approximately 5 megahertz (MHz) and approximately 25 MHz.

Because the controller 120 controls operations associated with the sensor array 102, processing resources at the applications processor 140 may be freed as compared to a device that relies on an applications processor to control a sensor array. Further, because the controller 120 includes components that may be implemented using discrete components, design and/or manufacture of the mobile device 1500 may be simplified and more compact as compared to devices with many discrete components.

Although the particular example of FIG. 15 is described with reference to fingerprint identification, it should be appreciated that other configurations are within the scope of the disclosure. For example, those of skill in the art will recognize that in connection with the described embodiments, ultrasound waves can be transmitted and reflected from a stylus (e.g., a stylus used by a user to indicate one or more operations). Alternatively or in addition, ultrasound waves can be transmitted and reflected based on a "user touch" operation. As used herein, a user touch operation may include a user contacting a display surface (e.g., of the display device 1528), an ultrasonic touchpad, an ultrasonic fingerprint sensor, or other ultrasonic device to indicate one or more operations. For example, a user touch operation may indicate a selection operation (e.g., a "click"), a zoom operation, a "long press" operation (e.g., touching a portion of a touchscreen or touchpad for a particular time duration, such as in order to select or delete text and/or icons), a multi-touch operation (e.g., a gesture using multiple user actions and/or multiple user fingers), or a combination thereof.

In connection with the described embodiments, a method of operating an ultrasonic sensor array (e.g., the sensor array 102) includes applying a block value to a receiver bias electrode of the ultrasonic sensor array. The receiver bias electrode may correspond to the receiver bias electrode 104, and the block value may correspond to the block value 202. The method may further include applying a hold value to the receiver bias electrode. The hold value may correspond to the hold value 204. The receiver bias electrode is coupled to a plurality of pixel circuits of the ultrasonic sensor array. The plurality of pixel circuits may correspond to the piezoelectric sensor elements 108. The ultrasonic sensor array further includes a piezoelectric layer, such as the piezoelectric receiver layer 106.

In connection with the described embodiments, an apparatus includes means for biasing piezoelectric sensor elements of an ultrasonic sensor array using a receiver bias voltage. The ultrasonic sensor array may correspond to the sensor array 102, the piezoelectric sensor elements may correspond to the piezoelectric sensor elements 108, and the means for biasing the piezoelectric sensor elements may correspond to the receiver bias electrode 104. The apparatus further includes means for generating an ultrasonic wave based on a transmitter control signal received at the ultrasonic sensor array. The ultrasonic wave may correspond to the ultrasonic wave 150, and the means for generating the ultrasonic wave may correspond to the ultrasonic transmitter 112. The transmitter control signal may be received via the terminal 128, such as from the transmitter H-bridge circuit 722. The apparatus further includes means for generating data samples based on a reflection of the ultrasonic wave. The data samples may correspond to the data samples 110, the reflection of the ultrasonic wave may correspond to the reflected ultrasonic wave 152, and the means for generating the data samples may correspond to the piezoelectric sensor elements 108. The receiver bias voltage and the transmitter control signal are received from an integrated circuit that is coupled to the ultrasonic sensor array. The integrated circuit may correspond to the controller 120. The receiver bias voltage has a hold value during a first time interval that is prior to a main burst of the ultrasonic wave. The hold value may correspond to the hold value 204, and the first time interval may correspond to the first time interval 212 and/or the first time interval 1102. The receiver bias voltage has a block value during a second time interval associated with the main burst of the ultrasonic wave. The block value may correspond to the block value 202, and the second time interval may correspond to the second time interval 214 and/or the second time interval 1104. The receiver bias voltage has a sample value during a third time interval associated with a reflection of the ultrasonic wave. The sample value may correspond to the sample value 206, and the third time interval may correspond to the third time interval 216 and/or the third time interval 1106. The receiver bias voltage may have the block value during a fourth time interval associated with a bounce of the reflection of the ultrasonic wave. The fourth time interval may correspond to a portion of the fourth time interval 1108.

In connection with the described embodiments, a computer-readable medium (e.g., the memory 1532) stores instructions (e.g., the instructions 142) that are executable by a processor to initiate one or more operations described herein. The processor is included in an integrated circuit that is coupled to a sensor array, such as the sensor array 102. In a particular embodiment, the integrated circuit corresponds to the controller 120, and the processor is included in the controller 120. The operations may include providing a receiver bias voltage to the receiver bias electrode 104 of the sensor array 102. The operations may further include providing a first signal to the sensor array 102. A second signal is received from the sensor array 102. The first signal may be provided to the sensor array 102 via the terminal 128 (e.g., from the transmitter H-bridge circuit 722), and the second signal may correspond to the data samples 110, which may be received from the sensor array 102 via the terminal 126. An ultrasonic wave (e.g., the ultrasonic wave 150) may be generated based on the first signal, and the second signal may be generated based on a reflection of the ultrasonic wave (e.g., the reflected ultrasonic wave 152). The receiver bias voltage has a hold value during a first time interval that is prior to a main burst of the ultrasonic wave. The hold value may correspond to the hold value 204, and the first time interval may correspond to the first time interval 212 and/or the first time interval 1102. The receiver bias voltage has a block value during a second time interval associated with the main burst of the ultrasonic wave. The block value may correspond to the block value 202, and the second time interval may correspond to the second time interval 214 and/or the second time interval 1104. The receiver bias voltage has a sample value during a third time interval associated with the reflection of the ultrasonic wave. The sample value may correspond to the sample value 206, and the third time interval may correspond to the third time interval 216 and/or the third time interval 1106. The receiver bias voltage may have the block value during a fourth time interval associated with a bounce of the reflection of the ultrasonic wave. The fourth time interval may correspond to a portion of the fourth time interval 1108.

In a particular embodiment, the operations further include buffering samples of the second signal in the memory device 716 and providing the samples to the applications processor 140. For example, the data samples 110 may be provided to the controller 120 on a "per-row" basis, such as by providing a first row of the samples to the applications processor 140 while a second row of the samples is buffered in the memory device 716. The operations may further include receiving a response (e.g., the response 1599) from the applications processor 140 after providing the samples to the applications processor 140. In one example, the response 1599 indicates selection of an alternate frequency of oscillation of the ultrasonic transmitter 112 (e.g., from the first frequency 1516 to the nth frequency 1518, or vice versa). In another example, the response 1599 may indicate to maintain a current frequency of oscillation for the ultrasonic transmitter 112 (e.g., to maintain either the first frequency 1516 or the nth frequency 1518).

Those of skill in the art will appreciate that the foregoing disclosed devices and functionalities may be designed and configured into computer files (e.g., RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips, such as the controller 120 of FIG. 1. The semiconductor chips may be employed or otherwise integrated or included within devices. The controller 120 may be configured to read a sensor array having pixels arranged in rows and columns. The number of rows and columns may range from just a few, corresponding to one or more ultrasonic buttons or a small sensor array, to thousands or more in each row or column, corresponding to multiple-finger (e.g. four-finger) or palm-print readers, or to ultrasonic touchpads or ultrasonic touchscreens. A wake-up or power-up detection circuit may be provided with the ultrasonic sensor controller that detects single taps or a sequence of taps on the ultrasonic sensor array and generates a signal to wake up a mobile device, as an illustrative example. The sequence of taps may represent a password or code to control access to the mobile device.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory medium is coupled to the processor such that the processor can read information from, and write information to, the storage medium. In the alternative, the storage medium may be integral to the processor. The processor and the storage medium may reside in an application-specific integrated circuit (ASIC) and/or a field programmable gate array (FPGA) chip. The ASIC and/or FPGA chip may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of operating an ultrasonic sensor array, the method comprising:
   receiving a receiver bias voltage at a receiver bias electrode of the ultrasonic sensor array to bias piezoelectric sensor elements of the ultrasonic sensor array;
   receiving a transmitter control signal at the ultrasonic sensor array to cause an ultrasonic transmitter of the ultrasonic sensor array to generate an ultrasonic wave, the transmitter control signal distinct from the receiver bias voltage; and
   generating data samples based on a reflection of the ultrasonic wave,
   wherein the receiver bias voltage has a hold value while the receiver bias voltage is applied to the piezoelectric sensor elements during a first time interval that is prior to a main burst of the ultrasonic wave,
   wherein the receiver bias voltage has a block value while the receiver bias voltage is applied to the piezoelectric sensor elements during a second time interval associated with the main burst of the ultrasonic wave, and
   wherein the receiver bias voltage has a sample value while the receiver bias voltage is applied to the piezoelectric sensor elements during a third time interval associated with a reflection of the ultrasonic wave.

2. The method of claim 1, wherein the receiver bias voltage has the block value during a fourth time interval associated with a bounce of the reflection of the ultrasonic wave.

3. The method of claim 2, wherein the receiver bias voltage transitions from the block value to the hold value during the fourth time interval.

4. The method of claim 1, wherein the transmitter control signal corresponds to a burst signal that is received from a resonant circuit and wherein the ultrasonic wave is generated based on the burst signal.

5. The method of claim 1, wherein the piezoelectric sensor elements include thin-film transistors (TFTs) coupled to a piezoelectric receiver layer of the ultrasonic sensor array, and wherein the piezoelectric receiver layer is coupled to the receiver bias electrode.

6. The method of claim 1, wherein the ultrasonic sensor array is integrated within a mobile device, and wherein the ultrasonic wave is substantially perpendicular to a surface of a display device of the mobile device.

7. The method of claim 1, wherein the ultrasonic wave is reflected from a stylus or a finger of a user, and wherein the block value is greater than the hold value, and wherein the hold value is greater than the sample value.

8. The method of claim 1, wherein the data samples are generated by the piezoelectric sensor elements based on the reflection of the ultrasonic wave, and further comprising accessing the data samples by an integrated circuit.

9. The method of claim 8, wherein the receiver bias voltage is received from a first terminal of the integrated circuit, wherein the data samples are accessed by the integrated circuit via a second terminal of the integrated circuit, and wherein the transmitter control signal is received from a third terminal of the integrated circuit.

10. The method of claim 1, further comprising:
transitioning the receiver bias voltage from the block value or the sample value to the hold value; and
after transitioning the receiver bias voltage and during a fourth time interval that is after the third time interval, performing a readout operation to provide data associated with the reflection to a controller.

11. An apparatus comprising:
an ultrasonic sensor array that includes piezoelectric sensor elements;
a receiver bias electrode configured to bias the piezoelectric sensor elements of the ultrasonic sensor array; and
an ultrasonic transmitter configured to receive a transmitter control signal and to generate an ultrasonic wave in response to the transmitter control signal,
wherein the ultrasonic sensor array is configured to generate data samples based on a reflection of the ultrasonic wave,
wherein the receiver bias electrode is further configured to bias the piezoelectric sensor elements based on a hold value during a first time interval that is prior to a main burst of the ultrasonic wave,
wherein the receiver bias electrode is further configured to bias the piezoelectric sensor elements based on a block value during a second time interval associated with the main burst of the ultrasonic wave, and
wherein the receiver bias electrode is further configured to bias the piezoelectric sensor elements based on a sample value during a third time interval associated with a reflection of the ultrasonic wave.

12. The apparatus of claim 11, wherein the receiver bias electrode includes a metal layer that is adjacent to a piezoelectric receiver layer, and wherein the piezoelectric receiver layer is coupled to the piezoelectric sensor elements.

13. The apparatus of claim 12, further comprising a substrate, the piezoelectric sensor elements disposed on the substrate, wherein the piezoelectric receiver layer is disposed on the piezoelectric sensor elements, and wherein the metal layer of the receiver bias electrode is disposed on the piezoelectric receiver layer.

14. The apparatus of claim 11, further comprising an application-specific integrated circuit (ASIC) that is coupled to the ultrasonic sensor array and that is configured to drive the ultrasonic sensor array.

15. The apparatus of claim 14, wherein the ultrasonic sensor array is responsive to a resonant circuit that is controlled by the ASIC, and wherein the resonant circuit includes inductors.

16. The apparatus of claim 14, further comprising one or more multiplexers (MUXs) of the ultrasonic sensor array, wherein the one or more MUXs are configured to provide the data samples to the ASIC.

17. The apparatus of claim 16, wherein the one or more MUXs are further configured to provide the data samples to the ASIC based on a second plurality of enable signals received from a row-read state machine of the ASIC.

18. The apparatus of claim 11, further comprising a display device, wherein the ultrasonic sensor array is integrated within the display device.

19. The apparatus of claim 18, further comprising a mobile device, wherein the mobile device includes the display device.

20. The apparatus of claim 11, further comprising a substrate, wherein the piezoelectric sensor elements are formed on the substrate.

21. The apparatus of claim 11, further comprising a resonant circuit coupled between the ultrasonic transmitter and an integrated circuit, wherein the transmitter control signal corresponds to a burst signal that is received from the integrated circuit via the resonant circuit, and wherein the ultrasonic wave is generated based on the burst signal.

22. The apparatus of claim 11, wherein the piezoelectric sensor elements include a thin film transistor (TFT) pixel circuit that includes a diode that is responsive to a diode bias signal.

23. The apparatus of claim 22, wherein the TFT pixel circuit further includes a first transistor, and wherein the first transistor is configured to receive, via a capacitive coupling, a bias voltage corresponding to the hold value, the block value, or the sample value.

24. The apparatus of claim 23, wherein a gate terminal of the first transistor is coupled to the receiver bias electrode via a capacitor.

25. The apparatus of claim 23, wherein the ultrasonic sensor array further includes a piezoelectric receiver layer that is configured to generate a surface charge based on the reflection of the ultrasonic wave, and wherein the TFT pixel circuit is configured to generate a signal based on the surface charge using the diode and the first transistor.

26. The apparatus of claim 23, wherein the TFT pixel circuit further includes a second transistor, wherein the second transistor is responsive to the signal to generate a data output signal of the TFT pixel circuit.

27. An apparatus comprising:
means for biasing piezoelectric sensor elements of an ultrasonic sensor array based on a hold value during a first time interval that is prior to a main burst of an ultrasonic wave, for biasing the piezoelectric sensor elements based on a block value during a second time interval associated with the main burst of the ultrasonic wave, and for biasing the piezoelectric sensor elements based on a sample value during a third time interval associated with a reflection of the ultrasonic wave;

means for generating the ultrasonic wave based on a transmitter control signal received at the ultrasonic sensor array; and means for generating data samples based on a reflection of the ultrasonic wave.

28. The apparatus of claim 27, wherein the means for biasing the piezoelectric sensor elements includes a receiver bias electrode, wherein the means for generating the ultrasonic wave includes an ultrasonic transmitter, and wherein the means for generating the data samples includes piezoelectric sensor elements.

* * * * *